US006883017B1

(12) United States Patent
Ujigawa et al.

(10) Patent No.: US 6,883,017 B1
(45) Date of Patent: Apr. 19, 2005

(54) SYSTEM AND METHOD FOR DISTRIBUTING AND COLLECTING INFORMATION BETWEEN A SERVER AND A PLURALITY OF CLIENTS BY MERGING A COMMUNICATION BLOCK FROM A FINAL CLIENT OF EACH CIRCULATION DESTINATION IN EACH OF A PLURALITY OF GROUPS

(75) Inventors: Taichi Ujigawa, Kobe (JP); Katzumi Hayashi, Kobe (JP); Masaya Kimura, Kobe (JP); Yasutaka Oda, Kobe (JP)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 09/697,182

(22) Filed: Oct. 27, 2000

(30) Foreign Application Priority Data

Jan. 27, 2000 (JP) ........................................ 2000-019230

(51) Int. Cl.[7] ............................................. G06F 15/16
(52) U.S. Cl. ...................... 709/203; 709/202; 709/206; 709/207; 709/232; 709/238; 709/245; 718/102
(58) Field of Search ................................ 709/201–203, 709/221, 223–224, 232, 206–207, 238, 245, 101; 718/101–102

(56) References Cited

U.S. PATENT DOCUMENTS

| 4,321,703 | A | * | 3/1982 | Schwaertzel et al. | ....... 370/406 |
| 5,125,075 | A | * | 6/1992 | Goodale et al. | ............ 709/206 |
| 5,864,674 | A | * | 1/1999 | Goldman et al. | ............ 709/221 |
| 6,212,166 | B1 | * | 4/2001 | Akiyama et al. | ............ 370/236 |
| 6,233,601 | B1 | * | 5/2001 | Walsh | ........................ 709/202 |
| 6,256,747 | B1 | * | 7/2001 | Inohara et al. | ................. 714/4 |
| 6,269,080 | B1 | * | 7/2001 | Kumar | ....................... 370/236 |
| 6,460,050 | B1 | * | 10/2002 | Pace et al. | ............... 707/104.1 |
| 6,539,416 | B1 | * | 3/2003 | Takewaki et al. | ........... 709/202 |
| 2002/0073161 | A1 | * | 6/2002 | Yamazaki et al. | .......... 709/206 |

FOREIGN PATENT DOCUMENTS

| JP | 05056070 | | 8/1991 | | |
| JP | 05056070 | A | * 3/1993 | ........... | H04L/12/54 |
| JP | HEI 6-216934 | A | 8/1994 | | |
| JP | 07143162 | | 6/1995 | | |
| JP | 07143162 | A | * 6/1995 | ........... | H04L/12/54 |
| JP | 08008967 | | 1/1996 | | |
| JP | 08008967 | A | * 1/1996 | ........... | H04L/12/54 |
| JP | HEI 9-8801 | A | 1/1997 | | |
| JP | 09223086 | | 8/1997 | | |
| JP | 09223086 | A | * 8/1997 | ........... | G06F/13/00 |
| JP | HEI 6-274394 | A | 4/1998 | | |
| JP | 10190719 | | 7/1998 | | |
| JP | 10190719 | A | * 7/1998 | ........... | H04L/12/54 |
| JP | HEI 11-25185 | A | 1/1999 | | |
| JP | 11250166 | | 9/1999 | | |
| JP | 11250166 | A | * 9/1999 | ........... | G06F/19/00 |
| JP | 2001128255 | A | * 5/2001 | ............ | H04Q/9/00 |
| JP | 2001128255 | | 5/2001 | | |
| JP | 2001177533 | | 6/2001 | | |
| JP | 2001177533 | A | * 6/2001 | ........... | H04L/12/28 |
| KR | 2001068719 | | 1/2000 | | |
| KR | 337757 | B | * 5/2002 | ........... | H04L/12/28 |

* cited by examiner

*Primary Examiner*—Hosain Alam
*Assistant Examiner*—Oanh Duong
(74) *Attorney, Agent, or Firm*—Staas & Halsey LLP

(57) ABSTRACT

A server transmits distribution communication blocks to a relay client and other clients through the Internet. The communication blocks include at least addresses and pieces of distribution information of the relay client and the other clients. The relay client obtains the pieces of distribution information from the distribution communication blocks, and circulates the communication blocks in which distribution results are set to a client next in the order on the basis of the addresses. The last client that receives the distribution communication block transmits it to the relay client. The relay client relays the distribution communication block back to the server.

9 Claims, 25 Drawing Sheets

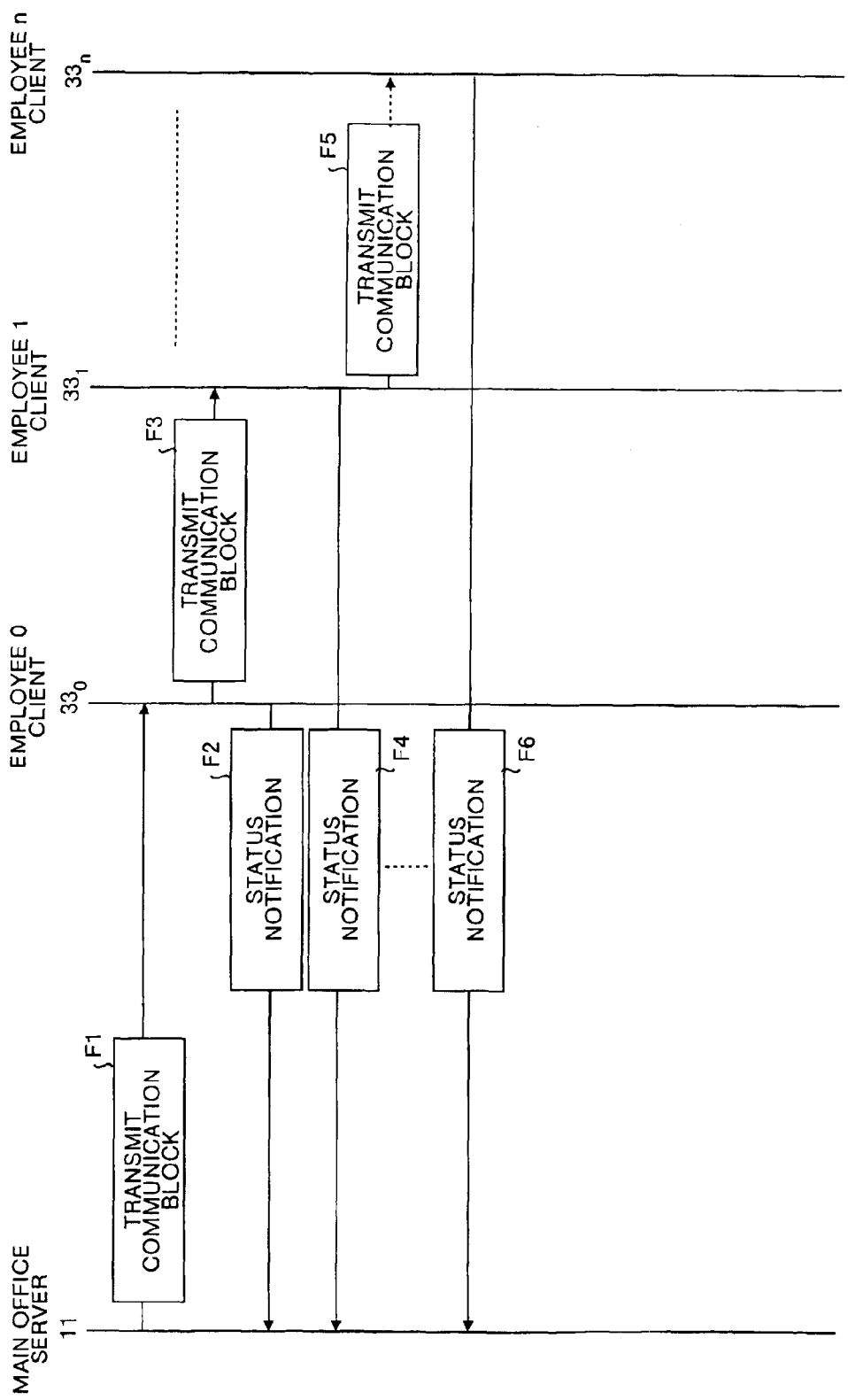

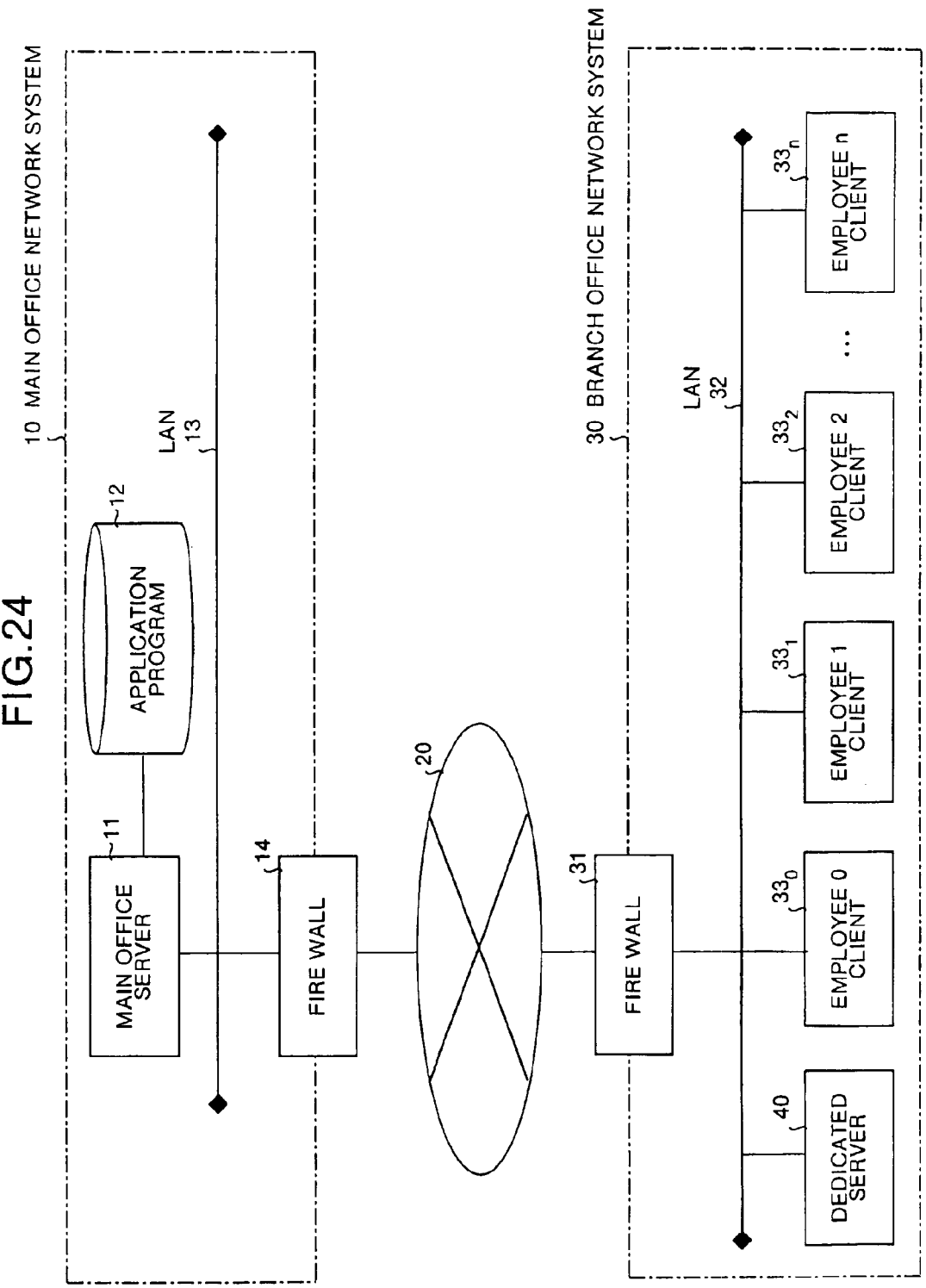

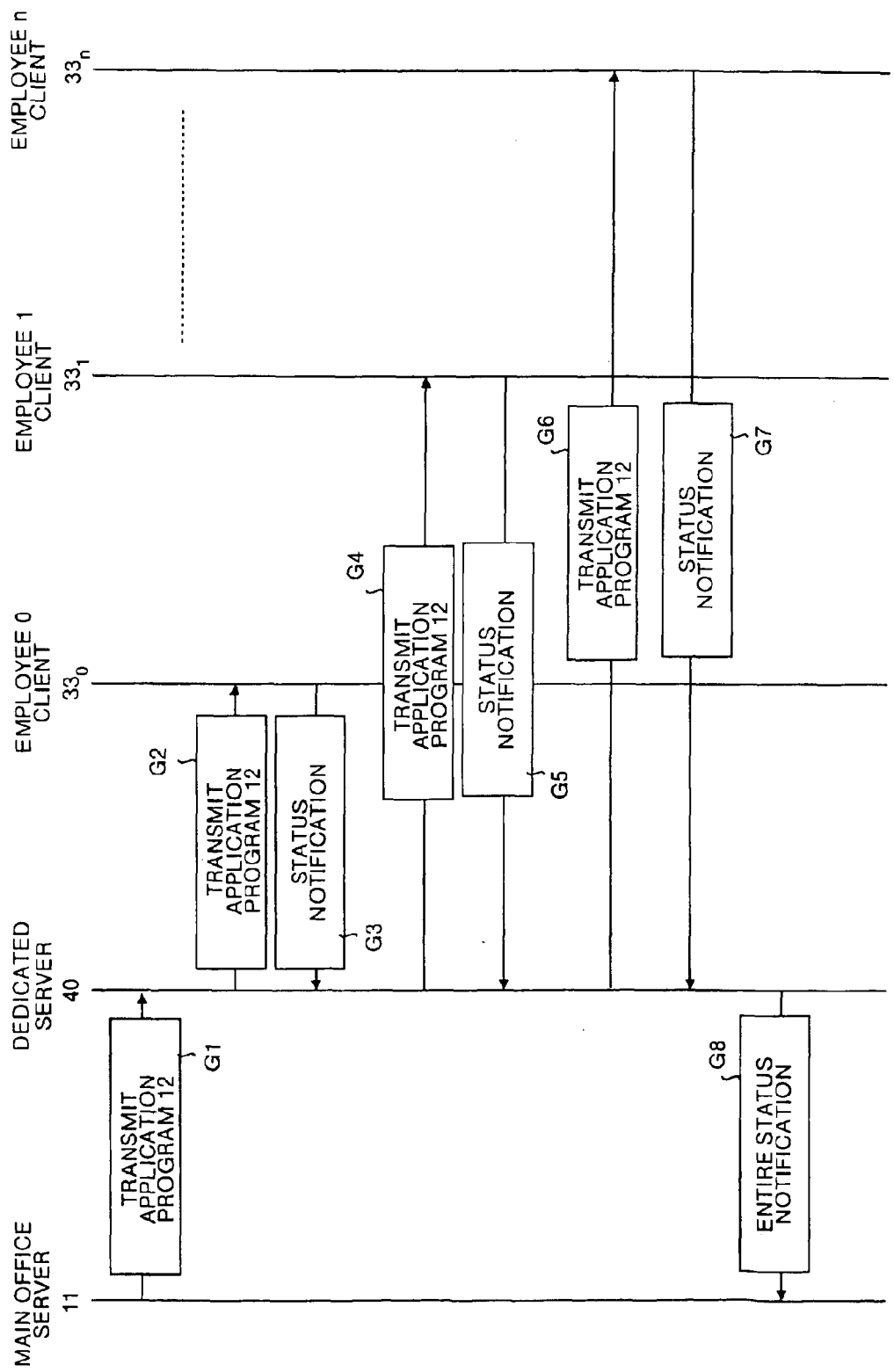

SYSTEM AND METHOD FOR DISTRIBUTING AND COLLECTING INFORMATION BETWEEN A SERVER AND A PLURALITY OF CLIENTS BY MERGING A COMMUNICATION BLOCK FROM A FINAL CLIENT OF EACH CIRCULATION DESTINATION IN EACH OF A PLURALITY OF GROUPS

FIELD OF THE INVENTION

The present invention relates to an information collection and distribution system for collecting and distributing information between computers which are connected to each other through a network.

BACKGROUND OF THE INVENTION

In recent years, with rapid spread of an advanced communication infrastructure represented by the Internet, collection and distribution of information between computers (e.g., between a server and a client) are generally performed according to a communication protocol such as the HTTP (Hypertext Transfer Protocol), the IIOP (Internet Inter ORB Protocol) or the FTP (File Transfer Protocol). However, recently, the following problems have arisen.

(1) In information collection and distribution through the Internet, illegal acts such as falsification, wiretapping, and pretending may be performed. For this reason, an operation load on a system manager for ensuring security tends to increases.

(2) With an increase in the number of accesses with an increase of the number of users, or an increase in the quantity of information (image data, audio data, computer program, and the like) to be collected and distributed, a load on a network increases.

(3) With an increase in the number of client device, a load on a server for controlling collection and distribution of information increases.

Accordingly, means and method for effectively solving the above-mentioned problems is in demand.

FIG. 22 is a block diagram showing an example of configuration of a conventional information collection and distribution system. In this diagram, a client/server type information collection and distribution system which is structured through a network having a LAN (Local Area Network)—WAN (Wide Area Network)—LAN form is shown. A main office network system 10 is an in-house system, and is constituted by a main office server 11, a LAN 13, and a fire wall 14.

The main office server 11 comprises a function of distributing information (e.g., an application program 12) to an employee 0 client $33_0$ to an employee n client $33_n$ (to be described later) and a function of collecting information from the employee 0 client $33_0$ and the employee n client $33_n$. The main office server 11 is connected to the LAN 13. The fire wall 14 is used to prevent illegal access to the main office network system 10 from an external system, and is designed to pass only information or a protocol to which a security is given. The LAN 13 is an in-house network installed in the main office, and is connected to the Internet 20 through the fire wall 14.

A branch office network system 30 is an in-house system structured in a branch office, and is constituted by a fire wall 31, a LAN 32, and an employee 0 client $33_0$ to an employee n client $33_n$. The fire wall 31 is used to prevent illegal access to the branch office network system 30. The LAN 32 is an in-house network installed in the branch office, and is connected to the Internet 20 through the fire wall 31. The employee 0 client $33_0$ to the employee n client $33_n$ are computers which are arranged for an employee 0 to an employee n (not shown) in the branch office, respectively, and are connected to the LAN 32.

Operation of the information collection and distribution system shown in FIG. 22 will be described below with reference to a sequence chart shown in FIG. 23. In step F1 in FIG. 23, the main office server 11 transmits an application program 12 as a communication block to the employee 0 client $33_0$ through the LAN 13, the fire wall 14, the Internet 20, the fire wall 31, and the LAN 32 (to be referred to as a network hereinafter) to distribute the application program 12 as information to the employee 0 client $33_0$ to the employee n client $33_n$ by a circulation system.

When the communication block (application program 12) is received, in step F2, the employee 0 client $33_0$ stores a copy of the application program 12 in a storage device (not shown), and then notifies the main office server 11 of a progress status of distribution through the network. Here, the status is that the communication block is received, i.e., that the communication block is circulated to the employee 1 client $33_1$ which is a circulation destination.

In step F3, the employee 0 client $33_0$ transmits (circulates) a communication block to the employee 1 client $33_1$ which is the next circulation destination through the LAN 32. When the communication block is received, in step F4, the employee 1 client $33_1$ stores a copy of the application program 12 in the storage device, and then notifies the main office server 11 of a progress status of distribution through the network.

In step F5, the employee 1 client $33_1$ transmits (circulates) the communication block to the employee 2 client $33_2$ which is a circulation destination through the LAN 32. Thereafter, the clients subsequent to the employee 2 client $33_2$ notify the main office server 11 of statuses, and sequentially transmit communication blocks to clients which are next circulation destinations.

When a communication block is transmitted to the employee n client $33_n$ which is the final circulation destination, the employee n client $33_n$, the employee n client $33_n$ stores a copy of the application program 12 in the storage device, and then notifies the main office server 11 of a progress status of distribution through the network.

In this manner, in the conventional information collection and distribution system, a communication program is transmitted to the employee 0 client $33_0$ which represents the employee 0 client $33_0$ and the employee n client $33_n$, and communication blocks are sequentially circulated to the employee 0 client $33_0 \rightarrow$ the employee 1 client $33_1 \rightarrow \ldots \rightarrow$ the employee n client $33_n$ in the branch office network system 30, so that information distribution is realized.

On the other hand, in the conventional information collection and distribution system, status notifications are performed from the employee 0 client $33_0$ to the employee n client $33_n$, respectively, so that collection of pieces of information is realized on the main office server 11 side.

FIG. 24 is a block diagram showing another example of the configuration of a conventional information collection and distribution system. The same reference numerals as in FIG. 22 denote the same parts in FIG. 24. In FIG. 24, a dedicated server 40 for controlling collection and distribution on the branch office network system 30 side is newly connected to the LAN 32.

Operation of the information collection and distribution shown in FIG. 24 will be described below with reference to the sequence diagram shown in FIG. 25. In step G1 shown in FIG. 25, the main office server 11 transmits the application program 12 to the dedicated server 40 through the Internet 20 to distribute the application program 12 as information to the employee 0 client $33_0$ to the employee n client $33_n$ by a circulation system.

When the application program 12 is received, in step G2, the dedicated server 40 transmits (circulates) the application program 12 to the employee 0 client $33_0$ which is the first circulation destination through the LAN 32. When the application program 12 is received, in step G3, the employee 0 client $33_0$ stores a copy of the application program 12 in the storage device, and then notifies the dedicated server 40 of a progress status of distribution through the LAN 32. Here, the status is that the application program 12 is distributed.

In step G4, the dedicated server 40 transmits the application program 12 to the employee 1 client $33_1$ which is the next circulation destination through the LAN 32. When the application program 12 is received, in step G5, the employee 1 client $33_1$ stores a copy of the application program 12 in the storage device, and then notifies the dedicated server 40 of a progress status of distribution through the LAN 32. Thereafter, transmission of the application program 12 from the dedicated server 40 to the client which is a circulation destination and status notification from the client to the dedicated server 40 are sequentially performed.

When the application program 12 is transmitted to the employee n client $33_n$ which is the final circulation destination in step G6, in step G7, the employee n client $33_n$ stores a copy of the application program 12 in the storage device, and then notifies the dedicated server 40 of a progress status of distribution through the LAN 32.

In this manner, when distribution (circulation) to the employee 0 client $33_0$ to the employee n client $33_n$ is completed, in step G8, the dedicated server 40 notifies the main office server 11 of an entire status obtained by collecting status notifications which are respectively received from the employee 0 client $33_0$ to the employee n client $33_n$ through the network.

Techniques related to the information collection and distribution by the circulation system are disclosed in Japanese Unexamined Patent Publication No. 9-8801, Japanese Examined Patent Publication No. 2740105, Japanese Unexamined Patent Publication No. 6-216934 and Japanese Unexamined Patent Publication No. 11-25185, respectively.

However, in the information collection and distribution system shown in FIG. 22, the status notifications are respectively performed from the employee 0 client $33_0$ to the employee n client $33_n$ to the main office server 11. For this reason, an amount of traffic on the network increases in proportion to the number of clients. Accordingly, the network and the main office server 11 disadvantageously receive a heavy load.

In addition, the information collection and distribution system shown in FIG. 22 is designed such that status notifications are respectively performed from the employee 0 client $33_0$ to the employee n client $33_n$. For this reason, it is not preferable that traffic passes through the fire wall 31 every status notification. Therefore, a load on a system manager for securing a security disadvantageously increases.

On the other hand, in the information collection and distribution system shown in FIG. 24, the dedicated server 40 is arranged to perform status notifications to the main office server 11 at once. For this reason, load on the Internet 20 and the LAN 13 are reduced, and the information collection and distribution system is more secured as compared to the information collection and distribution system shown in FIG. 22.

However, in the information collection and distribution system shown in FIG. 24, status notifications are still performed from the employee 0 client $33_0$ to the employee n client $33_n$ to the dedicated server 40, respectively. For this reason, a heavy load disadvantageously acts on the LAN 32. In the information collection and distribution system shown in FIG. 24, the dedicated server 40 must be arranged independently of the employee 0 client $33_0$ to the employee n client $33_n$, so that the costs disadvantageously increase.

In addition, in the information collection and distribution systems shown in FIG. 22 and FIG. 24, the circulation system is employed between the employee 0 client $33_0$ to the employee n client $33_n$. For this reason, a long period of time is disadvantageously required to end all the collection and distribution.

SUMMARY OF THE INVENTION

It is an object of this invention to provide an information collection and distribution system which can reduce load on the network cheaply, which has high security, and which can shorten a period of time required for collection and distribution.

In the information collection and distribution system according to the present invention, the server transmits communication blocks including at least addresses and pieces of distribution information of the plurality of clients to one client of the plurality of clients through the network. One client (the first client) obtains the pieces of distribution information from the communication blocks, and circulates the communication blocks in which distribution results are set to the next client on the basis of the addresses (thus, the information is distributed to clients one after the other). A final client (a client that has received the information last) transmits the communication block to the first client. The first client relays the communication block transmitted from the final client of the circulation destination to the server.

Thus, when a communication block is transmitted from the server to the first client, the first client obtains a piece of distribution information from the communication block, sets the distribution result in the communication block, and circulates the communication block to a client of the next circulation destination. Thereafter, communication blocks are sequentially circulated from clients to clients. In this manner, the respective clients obtain pieces of distribution information from communication blocks, and set distribution results in the communication blocks. A communication block from the final client of the circulation destination is relayed to the server through one client.

Thus, the first client performs the relay of information. When circulation of all communication blocks is completed, a communication block in which a distribution result is set is relayed to a server through the first client. For this reason, unlike the conventional technique, a dedicated server need not be arranged, and only a communication block may transmitted from an in-house network to an external network once. Therefore, a network load can be reduced cheaply and a high security can be maintained.

Other objects and features of this invention will become apparent from the following description with reference to the accompanying drawings.

BRIEF DESCRIPTION OF THE DRAWINGS

FIG. 23 is a sequence diagram for explaining an operation of the information collection and distribution system shown in FIG. 22.

FIG. 24 is a block diagram showing an another example of configuration of a conventional information collection and distribution system.

FIG. 25 is a sequence diagram for explaining an operation of the information collection and distribution system shown in FIG. 24.

DESCRIPTION OF THE PREFERRED EMBODIMENTS

Two preferred embodiments of an information collection and distribution system according to the present invention will be described below with reference to the accompanying drawings.

Figure 1:
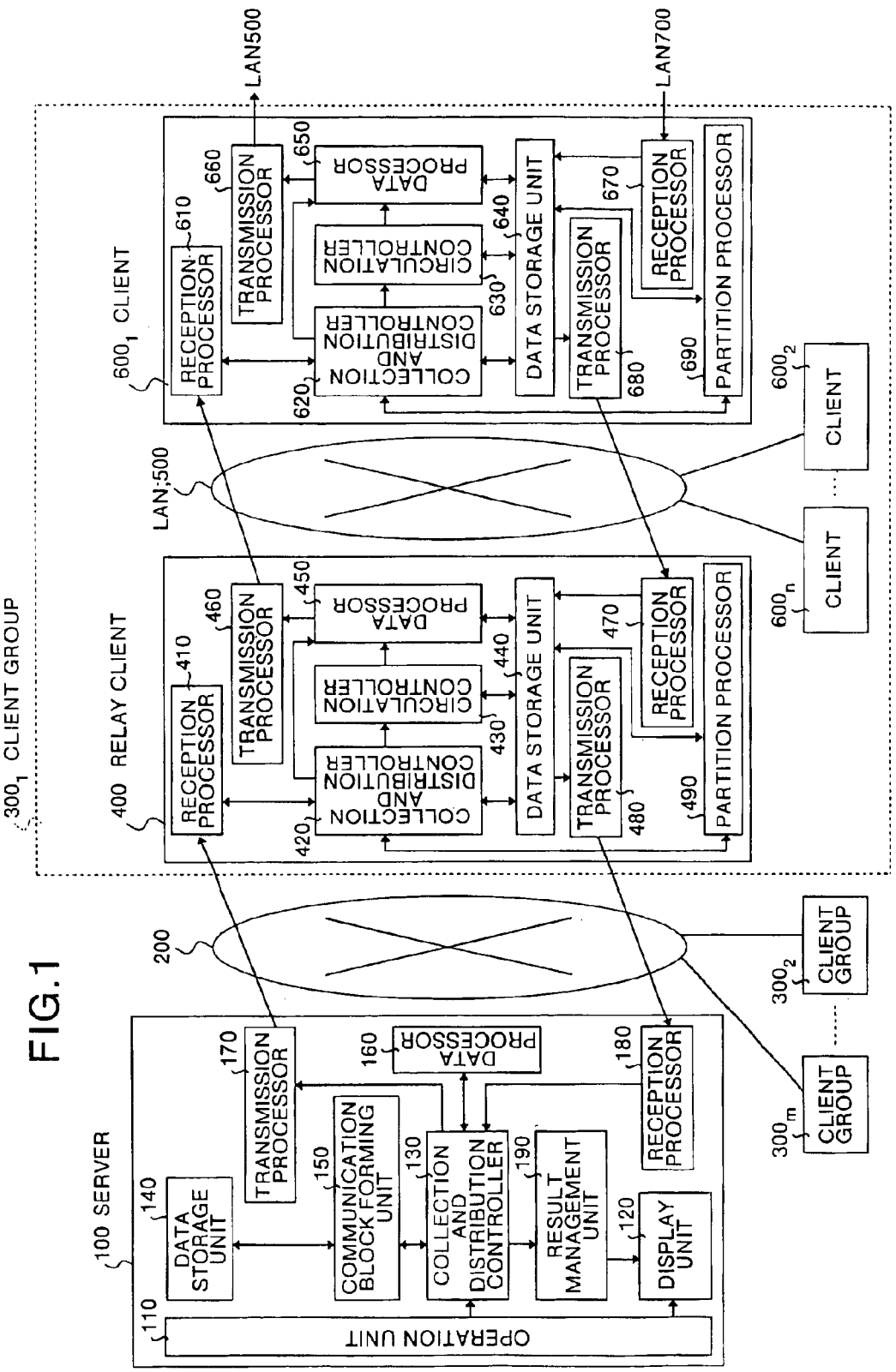
FIG. 1 is a block diagram showing the configuration of a first embodiment according to the present invention.

FIG. 1 is a block diagram showing the configuration of a first embodiment according to the present invention. In FIG. 1, a client/server type information collection and distribution system constructed through the Internet 200 is shown. A server 100 comprises a function of distributing pieces of information to client groups $300_1$ to $300_m$ and a function of collecting pieces of information from the client groups $300_1$ to $300_m$. As the pieces of information which are mentioned here, various data, various files, computer programs, and the like are used. The server 100 is connected to the Internet 200 through the fire wall to prevent illegal access from an external system.

The client group $300_1$ is constituted by n+1 clients, i.e., a relay client 400 and clients $600_1$ to $600_n$. Unique addresses are given to the relay client 400 and the clients $600_1$ to $600_n$, respectively. Each of the client groups $300_2$ to $300_m$ is also, constituted by a plurality of clients (including a relay client) like the client group $300_1$.

In the server 100, an operation unit 110 is a keyboard, a mouse, or the like for inputting information required to operate collection and distribution and to output the results of collection and distribution. A display unit 120 is an LCD (Liquid Crystal Display) or a CRT (Cathode-Ray Tube) for displaying various pieces of information used in collection and distribution. A collection and distribution controller 130 performs collection and distribution control. An operation of the collection and distribution controller 130 will be described below with reference to a flow chart.

A data storage unit 140 stores information to be distributed, collected information, and a communication block (to be described later). A communication block forming unit 150 forms a communication block used in collection and distribution to store the communication block in the data storage unit 140. As communication blocks mentioned here, a basic communication block 700 (see FIG. 2), a distribution communication block 800 (see FIG. 3), and a collection communication block 900 (see FIG. 4) are used. As the descriptive forms of the basic communication block 700, the distribution communication block 800, and the collection communication block 900, a binary form, a text form, an XML (extensible Markup Language) form which rapidly spreads in recent years, and the like are used.

Figure 2:
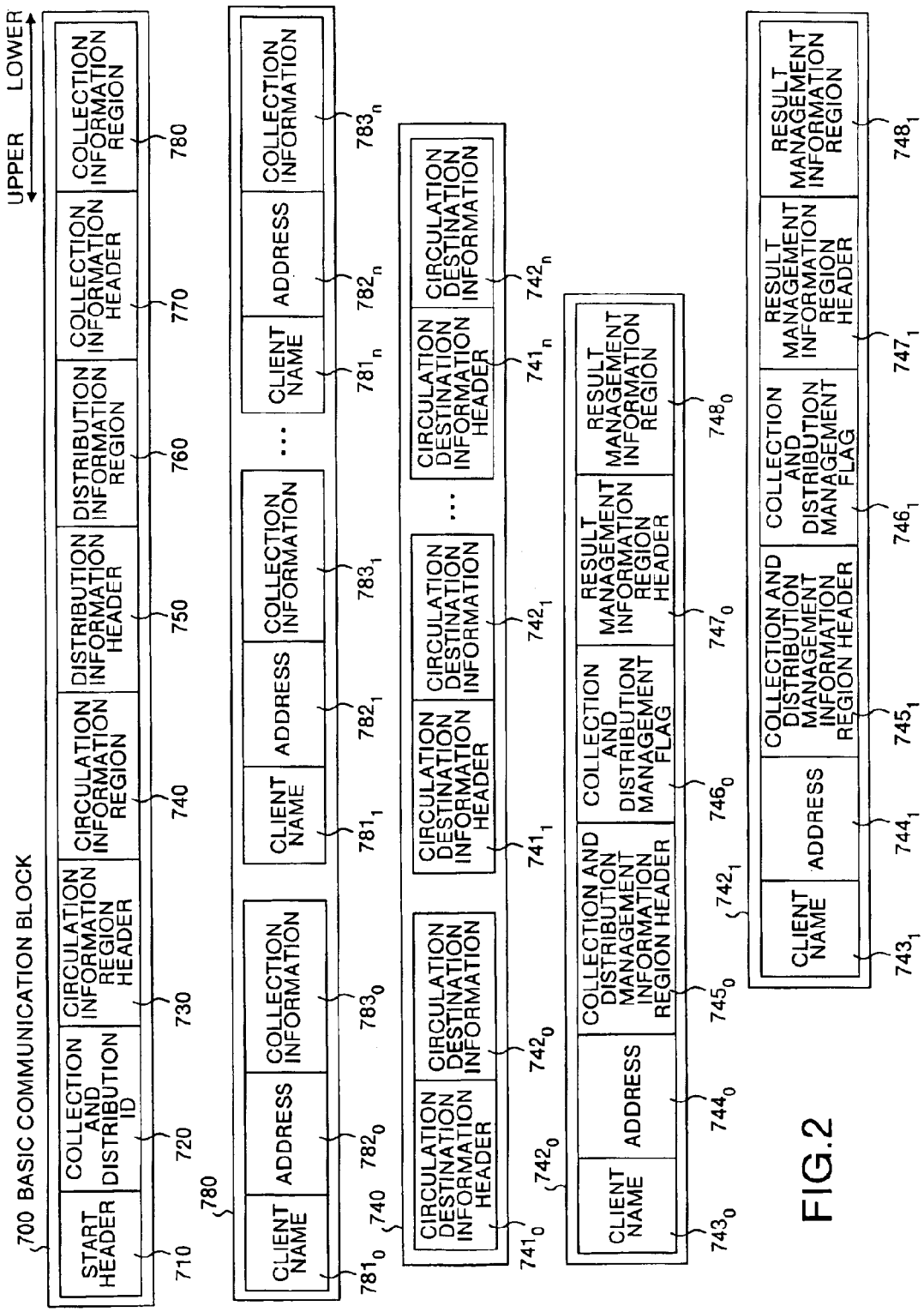
FIG. 2 is a diagram showing the data structure of a basic communication block 700 used in the first embodiment.

The basic communication block 700 shown in FIG. 2 is constituted by a start header 710, a collection and distribution ID 720, a circulation information region header 730, a circulation information region 740, a distribution information header 750, a distribution information region 760, a collection information header 770, and a collection information region 780 to perform collection and distribution in units of client groups each constituted by m clients.

The start header 710 is a header indicating a start position (leading position) of the basic communication block 700. The collection and distribution ID 720 is an identifier for uniquely identifying a communication job (collection or distribution). Therefore, the collection and distribution ID 720 is given to each communication job. The circulation information region header 730 is a header indicating a start position of the circulation information region 740. In the circulation information region 740, pieces of information related to circulation such as the client name of a circulation destination, an address, and the like are set.

More specifically, in the circulation information region 740, (n+1) pairs of pieces of information, i.e., a circulation destination information header $741_0$ and a circulation destination information $742_0$ (one pair), a circulation destination header $741_1$ and a circulation destination information $742_1$ (one pair), . . . , and a circulation destination information header $741_n$ and a circulation destination information $742_n$ (one pair) are set. These (n+1) pairs of pieces of information correspond to the (n+1) clients, e.g., the relay client 400 (upper level client) and the clients $600_1$ to $600_n$ (lower level clients) in the client group $300_1$ shown in FIG. 1, respectively.

The circulation destination information headers $741_0$ to $741_n$ are headers indicating the start positions of the pieces of circulation destination information $742_0$ to $742_n$, respectively. The pieces of circulation destination information $742_0$ to $742_n$ are constituted by information related to a destination (client) of circulation and information for management. More specifically, the circulation destination information $742_0$ is constituted by a client name $743_0$ an address $744_0$, a collection and distribution management information region header $745_0$, a collection and distribution management flag $746_0$, a result management information $747_0$, and a result management information region $748_0$. The client name $743_0$ is the name of a circulation destination (in this case, the relay client 400). The address $744_0$ is the address of the circulation destination (in this case, the relay client 400).

The collection and distribution management information region header $745_0$ is a flag indicating the start position of the collection and distribution management flag $746_0$. The collection and distribution management flag $746_0$ is a flag for managing a collection and distribution status, i.e., "collected", "uncollected", "distributed", or "undistributed". In this case, when the collection and distribution management flag $746_0$ is "collected" (or "distributed"), it means that information related to the relay client 400 is collected (distributed). On the other hand, when the collection and distribution management flag $746_0$ is "uncollected" (or "undistributed"), it means that information related to the relay client 400 is not collected (distributed).

The result management information $747_0$ is a flag indicating the start position of the result management information region $748_0$. The result management information region $748_0$ indicates the result of collection and distribution, i.e., "normal", "abnormal", "undefined". In this case, when the result management information region $748_0$ is "normal", it means that the collection and distribution related to the relay client 400 is normally performed. When the result management information region $748_0$ is "abnormal", it means that the collection and distribution related to the relay client 400 cannot be performed due to defect or the like. When the result management information region $748_0$ is "undefined", it means that the collection and distribution related to the relay client 400 have not been performed.

The circulation destination information $742_1$ has the same data structure as that of the circulation destination information $742_0$ described above, and is constituted by a client name $743_1$, an address $744_1$, a collection and distribution management information region header $745_1$, a collection and distribution management flag $746_1$, a result management information $747_1$, and a result management information region $748_1$. The client name $743_1$ is the name of a circulation destination (in this case, the client $600_1$). The address $744_1$ is the address of the circulation destination (in this case, the client $600_1$).

The collection and distribution management information region header $748_1$, is a flag indicating the start position of the collection and distribution management flag $746_1$. The collection and distribution management flag $746_1$ is a flag for managing a collection and distribution status, i.e., "collected", "uncollected", "distributed", or "undistributed". In this case, when the collection and distribution management flag $746_1$ is "collected" (or "distributed"), it means that information related to the client $600_1$ is collected (distributed). On the other hand, when the collection and distribution management flag $746_1$ is "uncollected" (or "undistributed"), it means that information related to the client $600_1$ is not collected (distributed).

The result management information $747_1$ is a flag indicating the start position of the result management information region $748_1$. The result management information region $748_1$ indicates the result of collection and distribution, i.e., "normal", "abnormal", "undefined". In this case, when the result management information region $748_1$ is "normal", it means that the collection and distribution related to the client $600_1$ are normally performed. When the result management information region $748_1$ is "abnormal", it means that the collection and distribution related to the client $600_1$ cannot be performed due to defect or the like.

When the result management information region $748_1$ is "undefined", it means that collection and distribution related to the client $600_1$ have not been performed. Subsequently, by the same manner as described above, the circulation destination information $742_n$ has the same data structure as those of the circulation destination information $742_0$ and the circulation destination information $742_1$, and is information corresponding to the client $600_n$.

The distribution information header 750 is a header indicating the start position of the distribution information region 760. In the distribution information region 760, information to be distributed (computer program or the like) is set. The collection information header 770 is a header indicating the start position of the collection information region 780. In the collection information region 780, information related to collection is set. More specifically, in the collection information region 780, (n+1) sets of pieces of information, i.e., a client name $781_0$, an address $782_0$, collection information $783_0$ (one set), a client name $781_1$, an address $782_1$, collection information $783_1$ (one set), . . . , and a client name $781_n$, an address $782_n$, collection information $783_n$ (one set).

These (n+1) sets of pieces of information correspond to the (n+1) clients, e.g. the relay client 400 and the clients $600_1$ to $600_n$ in the client group $300_1$ shown in FIG. 1, respectively.

The client name $781_0$ is the name of a client (in this case, the relay client 400) to which the collection information $783_0$ is to be provided. The address $782_0$ is an address given to the relay client 400. The collection information $783_0$ is information collected in the server 100, and is information provided from the relay client 400.

The client name $781_1$ is the name of a client (in this case, the client $600_1$) to which the collection information $783_1$ is to be provided. The address $782_1$ is an address given to the client $600_1$. The collection information $783_1$ is information collected in the server 100, and is information provided from the client $600_1$.

Subsequently, similarly, the client name $781_n$ is the name of a client (in this case, the client $600_n$) to which the collection information $783_n$ is to be provided. The address $782_n$ is an address given to the client $600_n$. The collection information $783_n$ is information collected in the server 100, and is information provided from the client $600_n$.

Figure 3:
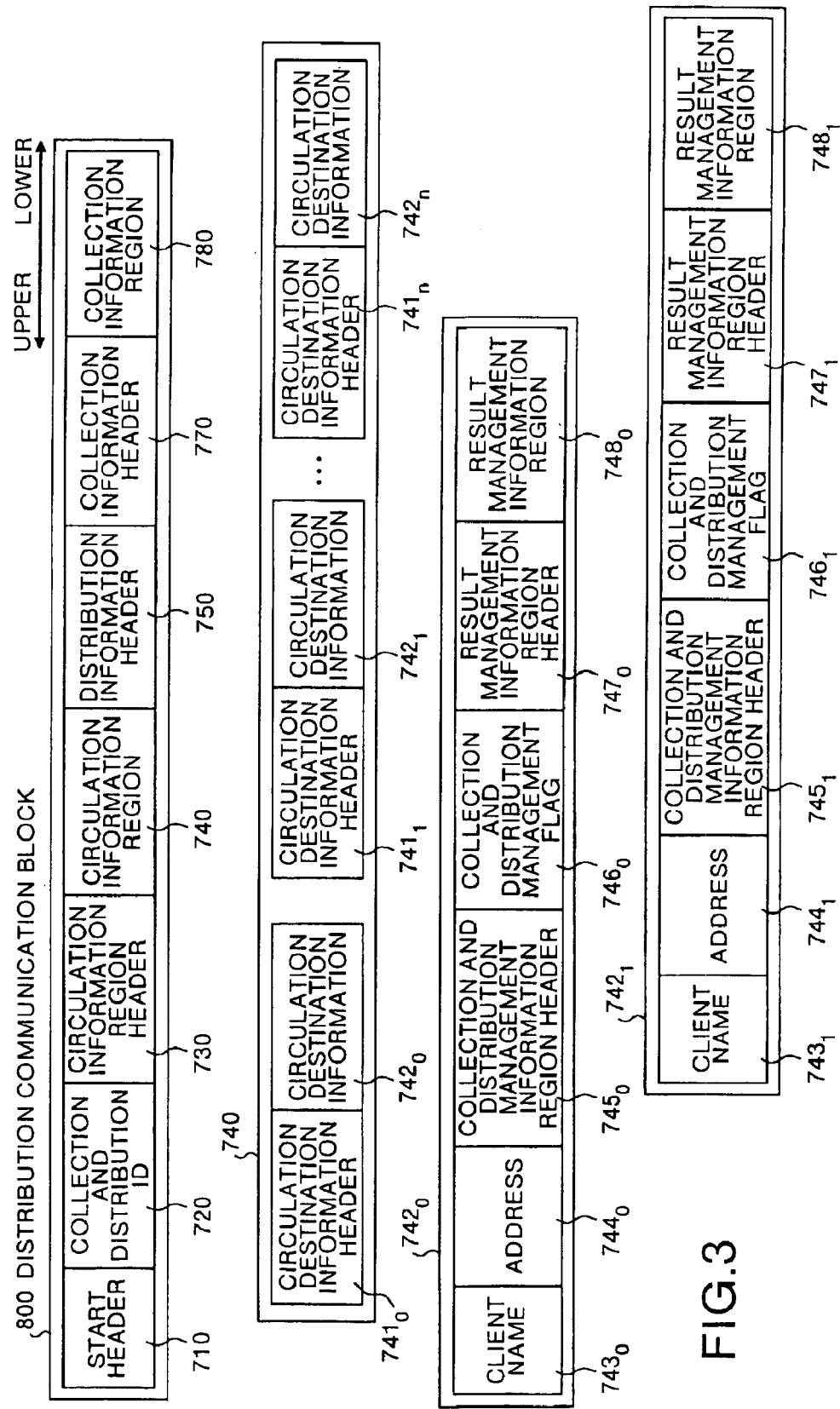
FIG. 3 is a diagram showing the data structure of a distribution communication block 800 used in the first embodiment.

The distribution communication block 800 shown in FIG. 3 is obtained by extracting information required for distribution from the basic communication block 700 shown in FIG. 2, and is constituted by pieces of information except for the collection information header 770 and the collection information region 780 (see FIG. 2). The same reference numerals as in FIG. 2 denote the same parts in FIG. 3. The distribution communication block 800 is used when information is distributed to the client group $300_1$ shown in FIG. 1. When pieces of information are distributed to the client groups $300_2$ to $300_m$, a plurality of distribution communication blocks each having the same data structure as that of the distribution communication block 800 are also formed.

Figure 4:
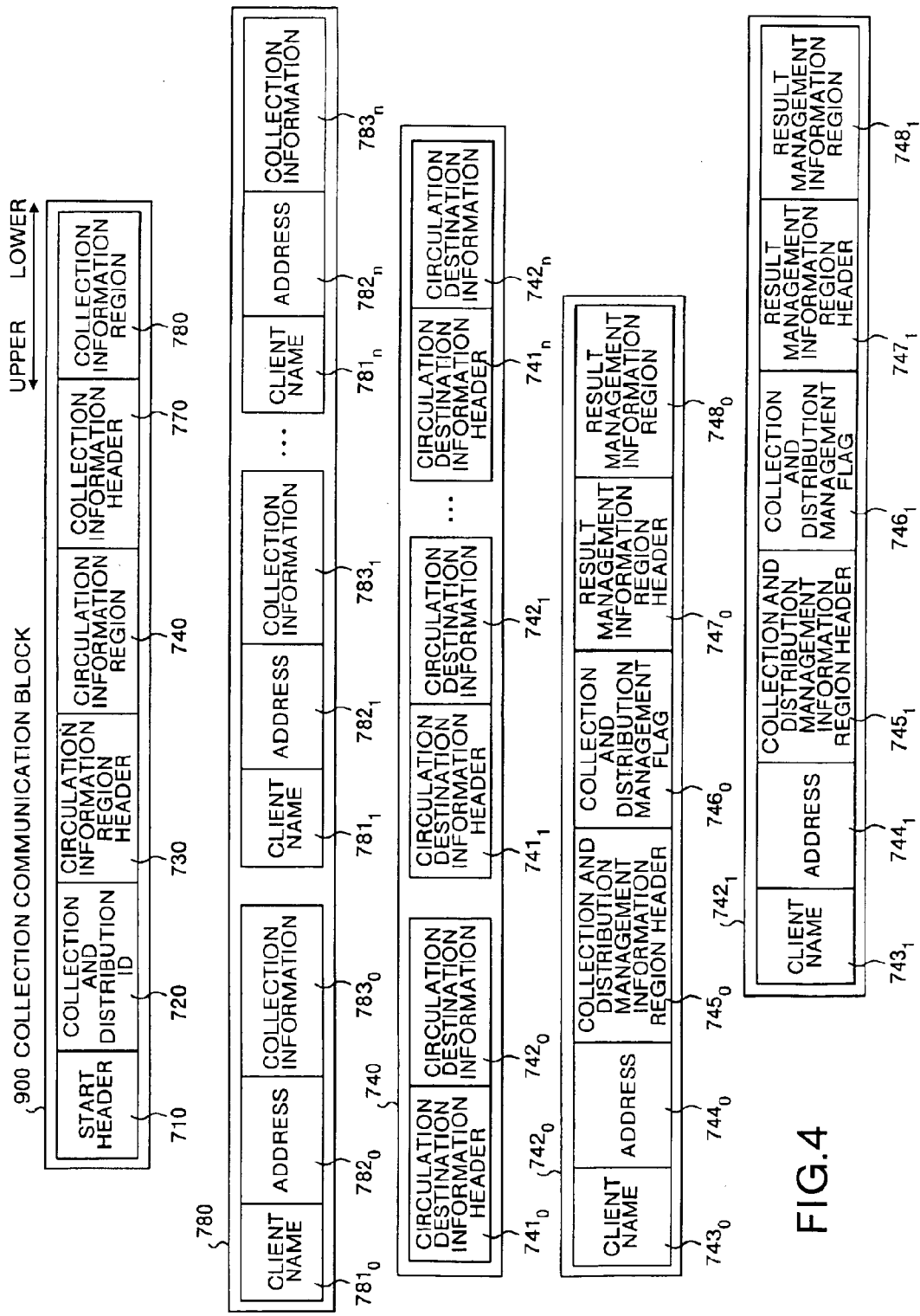
FIG. 4 is a diagram showing the data structure of a collection communication block 900 used in the first embodiment.

The collection communication block 900 shown in FIG. 4 is obtained by extracting information required for collection from the basic communication block 700 shown in FIG. 2, and is constituted by pieces of information except for the distribution information header 750 and the distribution information region 760 (see FIG. 2). The same reference numerals as in FIG. 2 denote the same parts in FIG. 4. The collection communication block 900 is used when information is collected from the client group $300_1$ shown in FIG. 1. When pieces of information are collected from the client groups $300_2$ to $300_m$, a plurality of collection communication blocks each having the same data structure as that of the collection communication block 900 are also formed.

Referring again to FIG. 1, a data processor 160 of the server 100 executes data processing to the distribution communication block 800 and the basic communication block 700. A transmission processor 170 transmits the distribution communication block 800 or the collection communication block 900 to, e.g., the relay client 400 of the client group $300_1$ through the Internet 200. A reception processor 180 receives the distribution communication block 800 or the collection communication block 900 through the internet 200. A result management unit 190 manages the results of collection and distribution.

In the client group $300_1$, the relay client 400 and the clients $600_1$ to $600_n$ are (n+1) computers, and circulate the distribution communication block 800 or the collection communication block 900 by a circulation system to realize distribution or collection. In this case, the relay client 400 also comprises, in addition to the functions of the clients $600_1$ to $600_n$, a relaying function which relays the distribution communication block 800 or the collection communication block 900 between the server 100 and the clients $600_1$ to $600_n$. The relay client 400 and the clients $600_1$ to $600_n$ are connected to each other through a LAN 500. In fact, the LAN 500 is connected to the Internet 200 through the fire wall.

In the relay client 400, a reception processor 410 receives the distribution communication block 800 or the collection communication block 900 from the server 100 through the Internet 200. A collection and distribution controller 420 is to perform collection and distribution control. The details of an operation of the collection and distribution controller 420 will be described later with reference to a flow chart. A data processor 430 performs data processing to the distribution communication block 800 or the collection communication block 900. A data storage unit 440 stores distribution information or other data distributed from the server 100.

A circulation controller 450 performs circulation control using the distribution communication block 800 or the collection communication block 900. A transmission processor 460 transmits the distribution communication block 800 or the collection communication block 900 to the client $600_1$ through the LAN 500. A reception processor 470 receives the distribution communication block 800 or the collection communication block 900 through the LAN 500.

A transmission processor 480 transmits the distribution communication block 800 or the collection communication block 900 to the server 100 through the Internet 200. A partition processor 490 executes processing when the clients $600_1$ to $600_n$ into a plurality of groups as will be described later in Operational. Example 3. The details of an operation of the partition processor 490 will be described later.

In the client $600_1$, a reception processor 610 receives the distribution communication block 800 or the collection communication block 900 from the relay client 400 through the LAN 500. A collection and distribution controller 620 is to perform collection and distribution control. The details of an operation of the collection and distribution controller 620 will be described later with reference to a flow chart. A data processor 630 performs data processing to the distribution communication block 800 or the collection communication block 900. A data storage unit 640 stores distribution information or other data distributed from the server 100.

A circulation controller 650 performs circulation control using the distribution communication block 800 or the collection communication block 900. A transmission processor 660 transmits the distribution communication block 800 or the collection communication block 900 to the client $600_2$ through the LAN 500. A reception processor 670 receives the distribution communication block 800 or the collection communication block 900 through the LAN 500.

A transmission processor 680 transmits the distribution communication block 800 or the collection communication block 900 to the relay client 400 through the LAN 500. A partition processor 690 executes processing when the clients $600_1$ to $600_n$ into a plurality of groups as will be described later in Operational Example 3. The details of an operation of the partition processor 690 will be described later.

Figure 5:
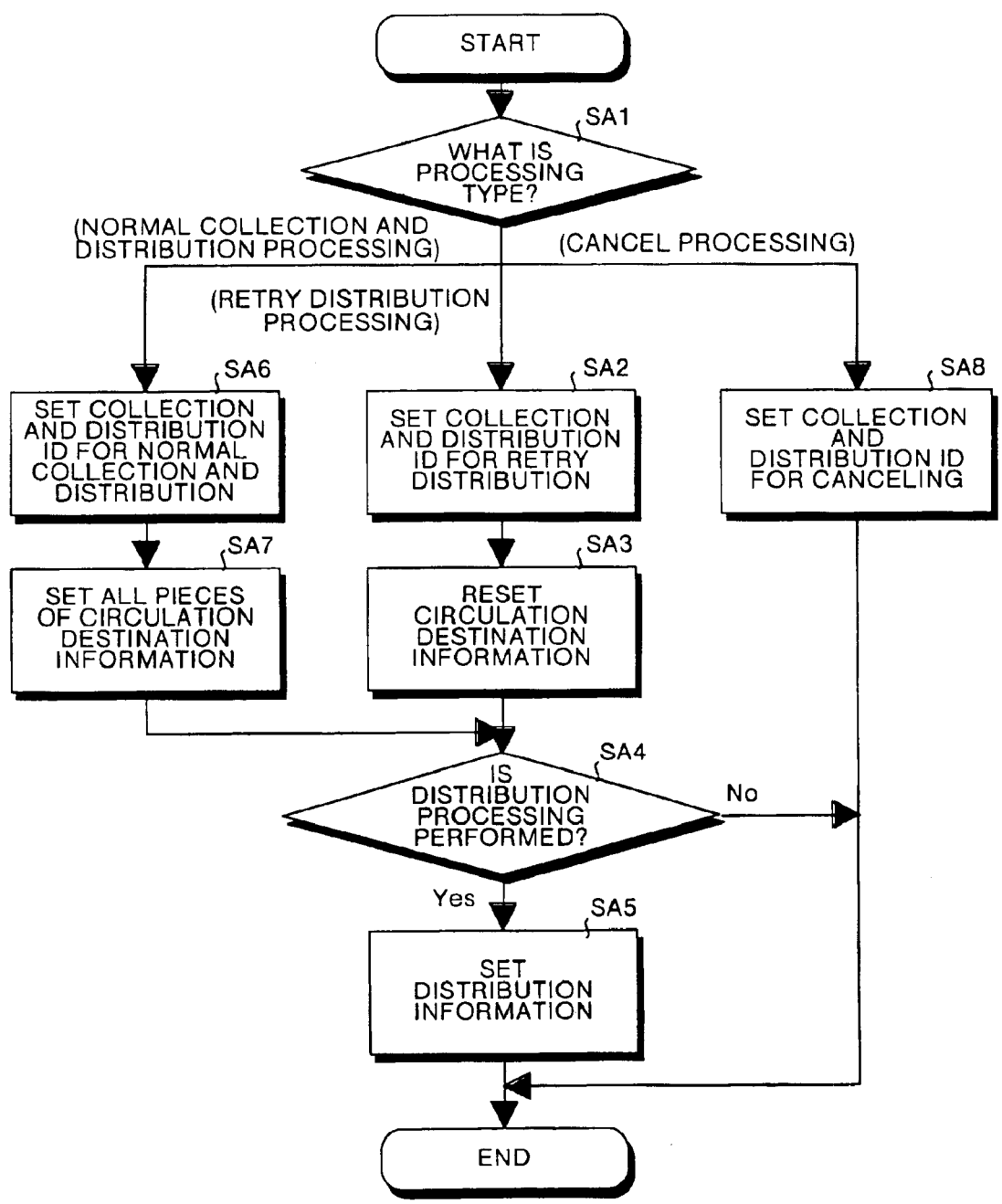
FIG. 5 is a flow chart for explaining an operation of a communication block forming unit 150 shown in FIG. 1.
Figure 6:
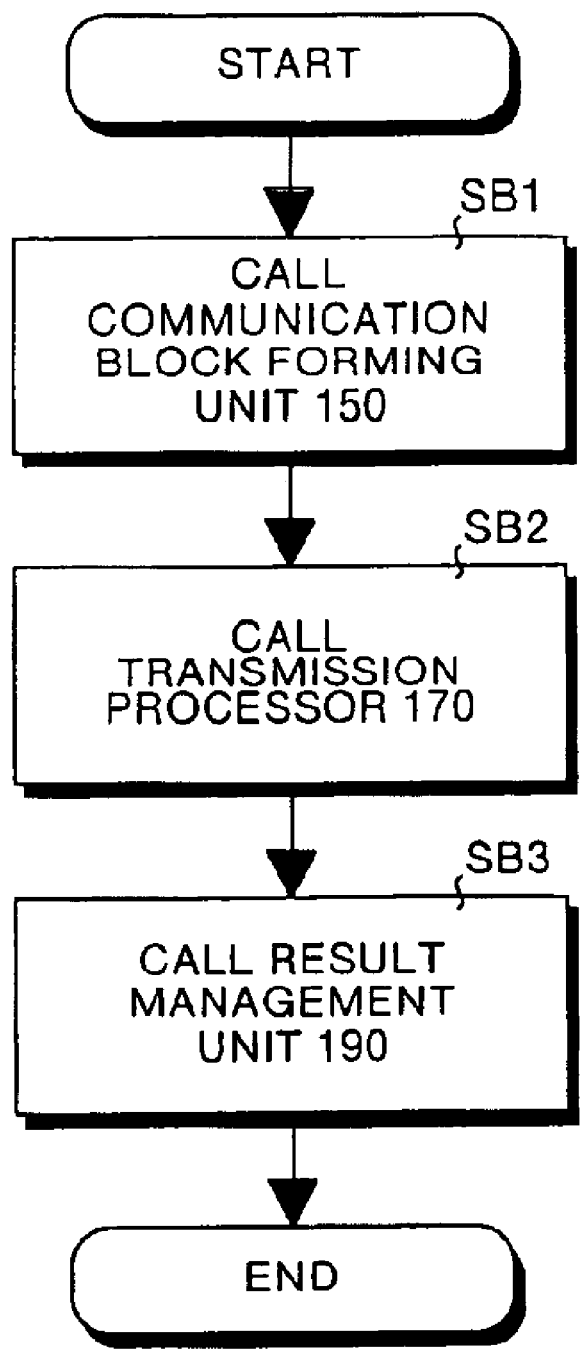
FIG. 6 is a flow chart for explaining an operation of a collection and distribution controller 130 shown in FIG. 1.

Operational Example 1 of the first embodiment will be described below with reference to flow charts respectively shown in FIG. 5 to FIG. 9 and sequence diagrams respectively shown in FIG. 10 to FIG. 12. FIG. 5 is a flow chart for explaining an operation of the communication block forming unit 150 in the server 100 shown in FIG. 1, and FIG. 6 is a flow chart for explaining an operation of the collection and distribution controller 130 in the server 100 shown in FIG. 1.

Figure 7:
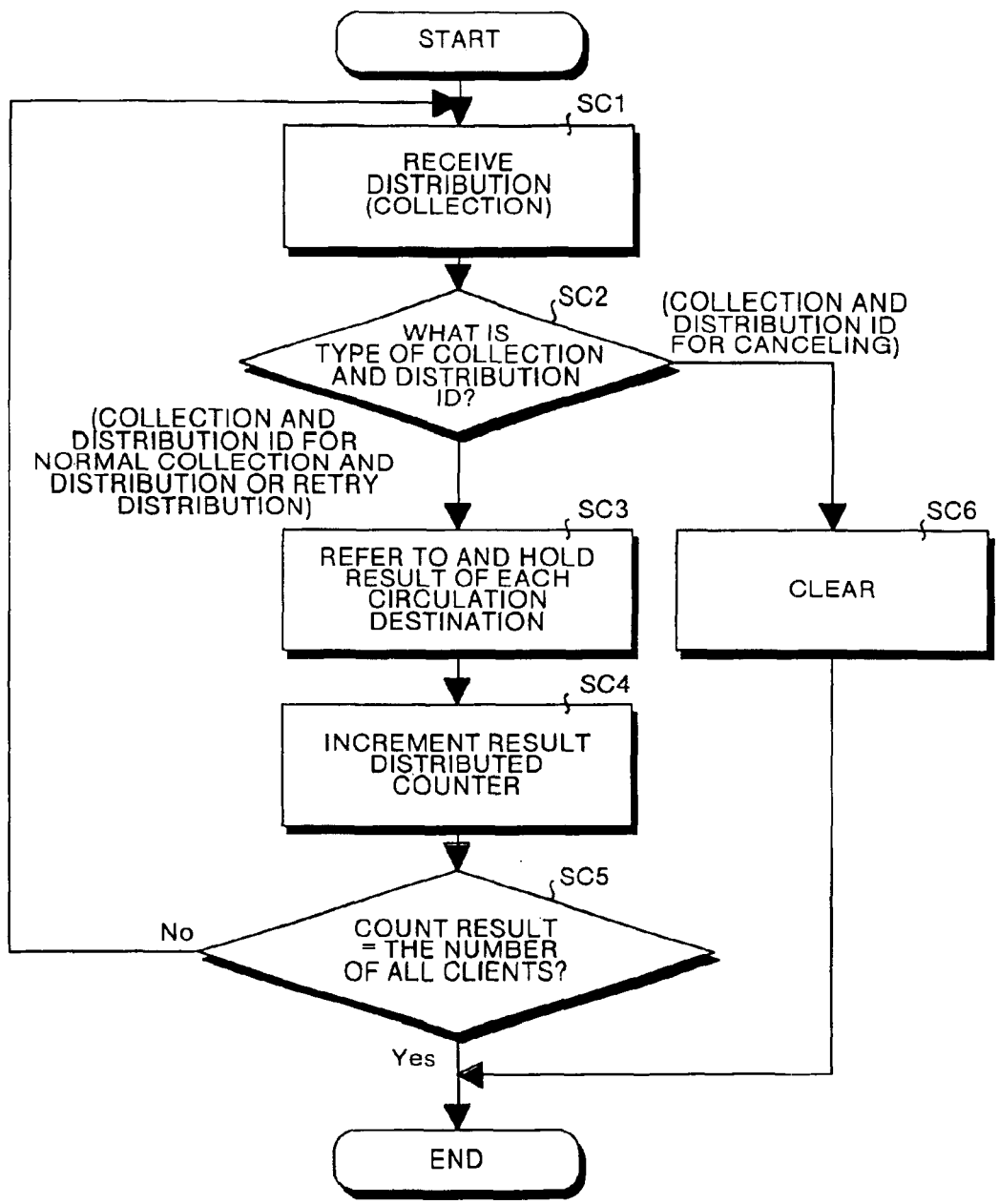
FIG. 7 is a flow chart for explaining an operation of a result management unit 190 shown in FIG. 1.
Figure 8:
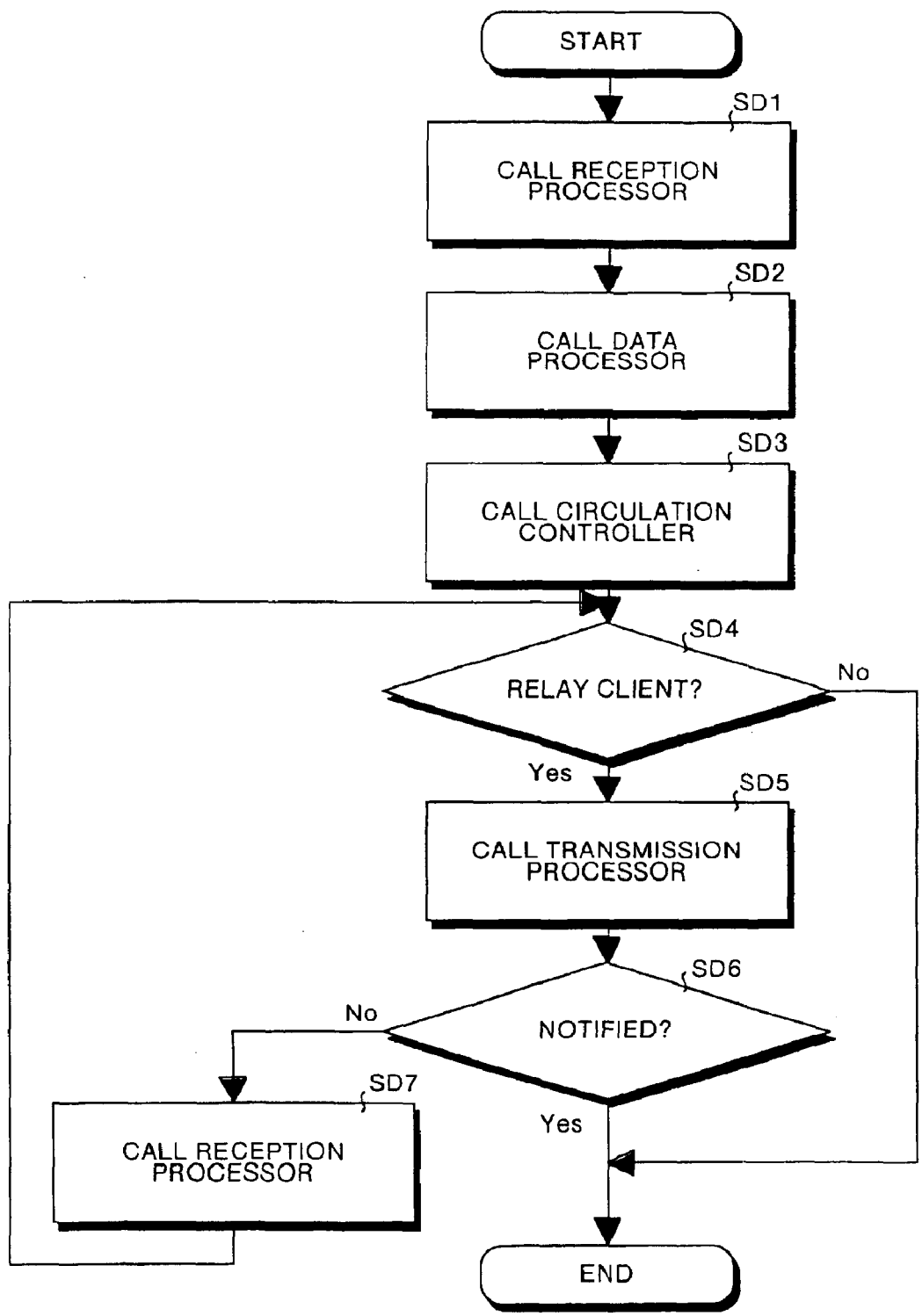
FIG. 8 is a flow chart for explaining operations of collection and distribution controllers 420 and 620 shown in FIG. 1.
Figure 9:
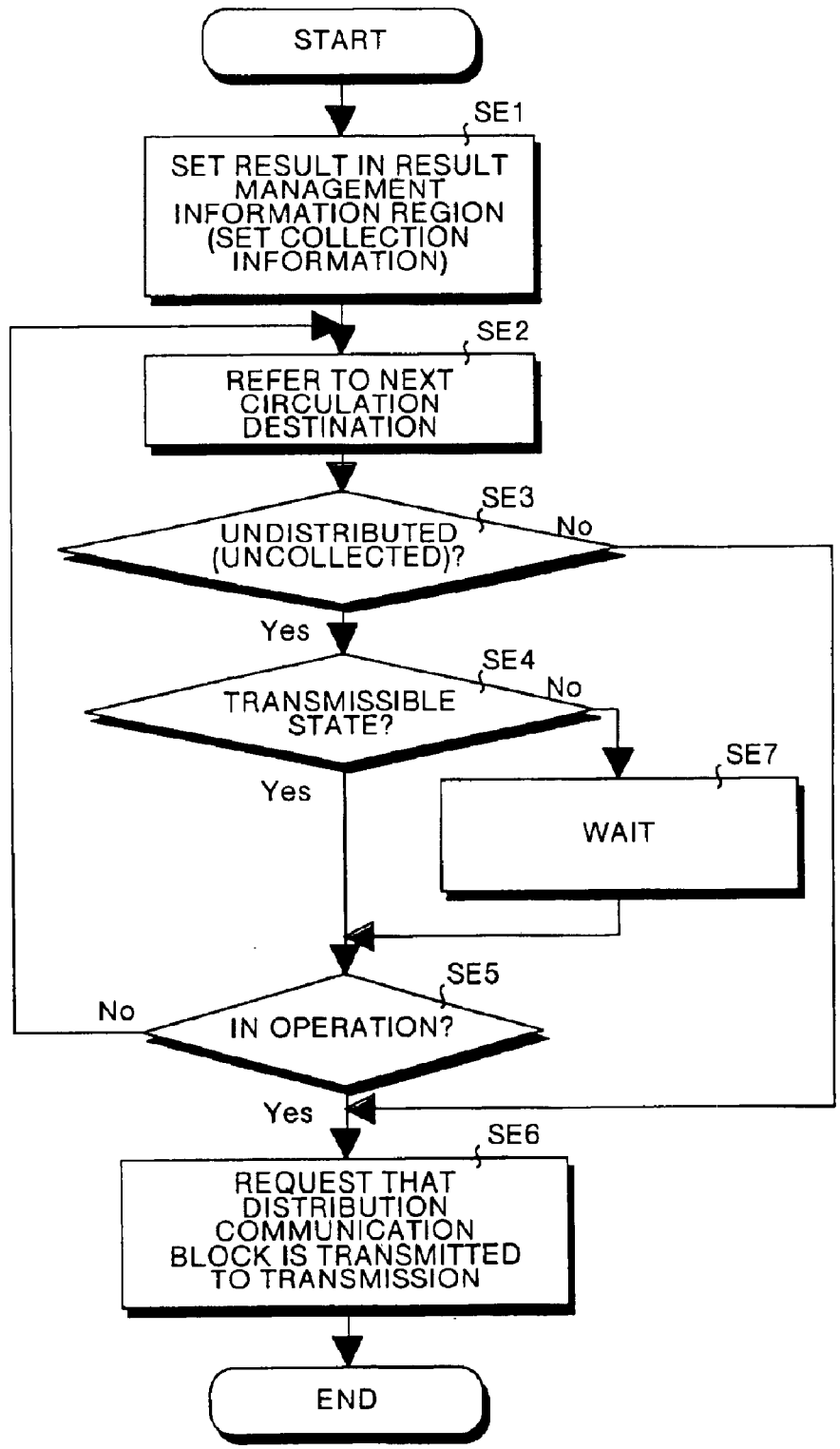
FIG. 9 is a flow chart for explaining operations of circulation controllers 450 and 650 shown in FIG. 1.

FIG. 7 is a flow chart for explaining an operation of the result management unit 190 in the server 100 shown in FIG. 1, and FIG. 8 is a flow chart for explaining operations of the collection and distribution controllers 420 and 620 in the relay client 400 and the client $600_1$ shown in FIG. 1. FIG. 9 is a flow chart for explaining an operation of the circulation controller 450 or 650 shown in FIG. 1. FIG. 10 is a sequence diagram for explaining a distribution operation in Operational Example 1 of the first embodiment. FIG. 11 is a sequence diagram for explaining a distribution operation in Operational Example 1 of the first embodiment. FIG. 12 is a sequence diagram for explaining a retry distribution operation in Operational Example 1.

First, a distribution operation in Operational Example 1 of the first embodiment will be described below with reference to FIG. 5 to FIG. 10. Subsequently, a case in which distribution information is distributed from the server 100 to the client group $300_1$ by a circulation system using the distribution communication block 800 will be described below. In step SB1 shown in FIG. 6, the collection and distribution controller 130 in the server 100 calls the communication block forming unit 150.

In this manner, in step SA1 shown in FIG. 5, the communication block forming unit 150 determines a processing type (normal collection and distribution processing, retry distribution processing, and cancel processing). As the normal collection and distribution processing, distribution processing using the distribution communication block 800 and collection processing using the collection communication block 900 are known.

In this case, when it is assumed that distribution processing designated by the collection and distribution controller 130, in step SA6, the communication block forming unit 150 forms the distribution communication block 800 shown in FIG. 3 from the basic communication block 700 (see FIG. 2), and then sets a collection and distribution ID 720 for normal collection and distribution is set in the distribution communication block 800. When cancel processing is designated, in step SA8, the communication block forming unit 150 sets a collection and distribution ID 720 for canceling.

In step SA7, the communication block forming unit 150 sets all the pieces of circulation destination information $742_0$ to $742_n$ shown in FIG. 3. More specifically, as destinations of circulation using the distribution communication block 800, all the relay client 400 and the clients $600_1$ to $600_n$ shown in FIG. 1 are set.

In step SA4, the communication block forming unit 150 determines whether distribution processing is performed by the control of the collection and distribution controller 130. In this case, it is assumed that the determination result is set to be "Yes". In step SA5, the communication block forming unit 150 sets distribution information (e.g., computer program) in the distribution information region 760 shown in FIG. 3, and gives the formed distribution communication block 800 to the collection and distribution controller 130.

In this manner, in step SB2 shown in FIG. 6, the collection and distribution controller 130 calls the transmission processor 170. More specifically, the collection and distribution controller 130 gives the distribution communication block 800 formed by the communication block forming unit 150 to the transmission processor 170. In this manner, in step A1 shown in FIG. 10, the transmission processor 170 of the server 100 transmits the distribution communication block 800 to the relay client 400 through the Internet 200.

When the distribution communication block 800 is received by the reception processor 410 of the relay client 400 shown in FIG. 1, in step A2, the relay client 400 copies distribution information set in the distribution information region 760 of the distribution communication block 800 shown in FIG. 3, and sets the result of distribution in the result management information region $748_n$.

More specifically, in step SD1 shown in FIG. 8, the collection and distribution controller 420 of the relay client 400 calls the reception processor 410 to cause the reception processor 410 to receive the distribution communication block 800. In step SD2, the collection and distribution controller 420 calls the data processor 430 to cause the data processor 430 to perform data processing to the distribution communication block 800. In this manner, the data processor 430 copies distribution information set in the distribution information region 760 of the distribution communication block 800 shown in FIG. 3, and then stores the copy in the data storage unit 440.

In step SD3, the collection and distribution controller 420 calls the circulation controller 450. In this manner, in step SE1 shown in FIG. 9, the circulation controller 450 sets "normal" as a result of distribution in the result management information region $748_0$ shown in FIG. 3. The circulation controller 450 sets "undistributed" in the collection and distribution management flag $746_0$. In step SE2, the circulation controller 450 refers to the circulation information region 740 shown in FIG. 3 and refers to the next circulation destination information $742_1$. The circulation destination information $742_1$ is information related to the client $600_1$ which is the next circulation destination.

In step SE3, the circulation controller 450 determines whether "undistributed" is set in the collection and distribution management flag $746_1$ of the circulation destination information $742_1$ which is referred to in step SE2. In this case, the determination result is set to be "Yes". In step SE4, the circulation controller 450 determines whether the distribution communication block 800 can be transmitted to the client $600_1$ which is the next circulation destination. In this case, the determination result is set to be "Yes". If the determination result in step SE4 is "No", in step SE7, the circulation controller 450 waits a predetermined period of time on the basis of time measurement by a timer (not shown).

In step SE5, the circulation controller 450, for example, uses a ping command or the like to determine whether the client $600_1$ which is the next circulation destination operates or not. If the determination result is "No", the circulation controller 450 executes processing subsequent to step SE2 related to the client $600_2$ which is the next circulation destination. In this case, if the determination result in step SE5 is "Yes", in step SE6, the circulation controller 450 requests of the transmission processor 460 that the distribution communication block 800 is transmitted to the next client $600_1$.

Figure 10:
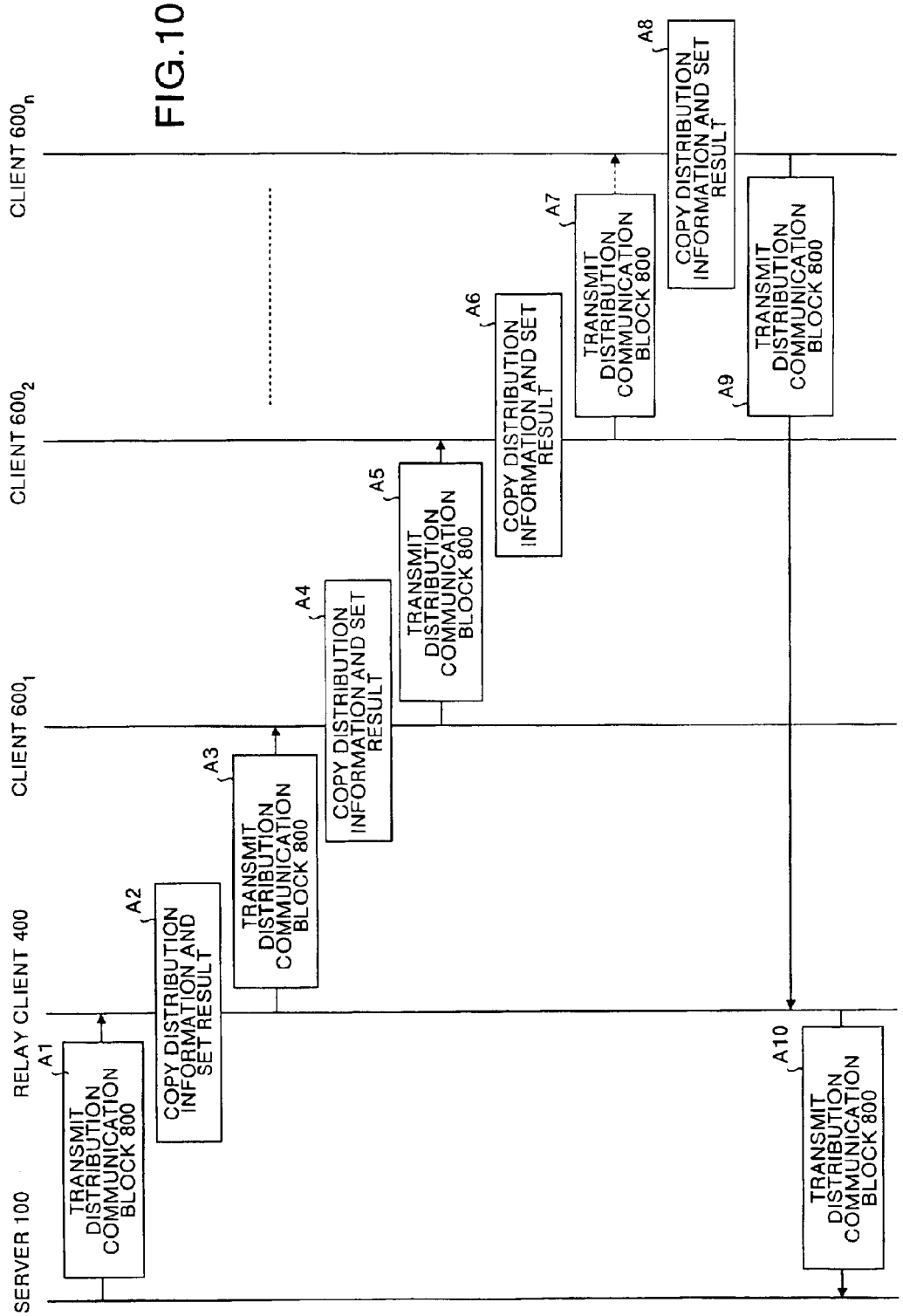
FIG. 10 is a sequence diagram for explaining a distribution operation in Operational Example 1 of the first embodiment.

In this manner, in step A3 shown in FIG. 10, the transmission processor 460 transmits the distribution communication block 800 to the client 600 through the LAN 500. In parallel to the transmission operation, in step SD4 shown in FIG. 8, the collection and distribution controller 420 determines whether a client in which the collection and distribution controller 420 is incorporated is the relay client 400 or not. In this case, the determination result is set to be "Yes". In step SD5, the collection and distribution controller 420 calls the transmission processor 480. At this time, any information is not transmitted from the transmission processor 480.

In step SD6, the collection and distribution controller 420 transmits the distribution communication block 800 to the server 100 to determine whether a status of distribution is notified or not. In this case, the determination result is set to be "No". In step SD7, the collection and distribution controller 420 calls the reception processor 470. In this manner, the reception processor 470 is set in a reception waiting state. Subsequently, the loop of step SD4 to SD7 is repeated.

When the distribution communication block 800 is received by the reception processor 610 of the client $600_1$, in step A4 shown in FIG. 10, the client $600_1$ copies distribution information set in the distribution information region 760 of the distribution communication block 800 shown in FIG. 3 to set a result of distribution in the result management information region $748_1$.

More specifically, in step SD1 shown in FIG. 8, the collection and distribution controller 620 of the client $600_1$ calls the reception processor 610 to cause the reception processor 610 to receive the distribution communication block 800. In step SD2, the collection and distribution controller 620 calls the data processor 630 to cause the data processor 630 to perform data processing to the distribution communication block 800. In this manner, the data processor 630 copies distribution information set in the distribution information region 760 of the distribution communication block 800 shown in FIG. 3, and then the copy in the data storage unit 640.

In step SD3, the collection and distribution controller 620 calls the circulation controller 650. In this manner, in step SE1 shown in FIG. 9, the circulation controller 650 sets "normal" as a result of distribution in the result management information region $748_1$ shown in FIG. 3. The circulation controller 650 sets "distributed" in the collection and distribution management flag $746_1$. In step SE2, the circulation controller 650 refers to the circulation information region 740 shown in FIG. 3 and refers to the next circulation destination information (not shown). The circulation destination information is information related to the client $600_2$ which is the next circulation destination.

In step SE3, the circulation controller 650 determines whether "undistributed" is set as a collection and distribution flag of the circulation destination information which is referred to in step SE2. In this case, the determination result is set to be "Yes". In step SE4, the circulation controller 650 determines whether the distribution communication block 800 can be transmitted to the client 6002 which is the next circulation destination. In this case, the determination result is set to be "Yes". If the determination result in step SE4 is "No", in step SE7, the circulation controller 650 waits a predetermined period of time on the basis of time measurement by the timer.

In step SE5, the circulation controller 650, for example, uses a ping command or the like to determine whether the client $600_2$ which is the next circulation destination operates or not. If the determination result is "No", the circulation controller 650 executes processing subsequent to step SE2 related to the client $600_3$ which is the next circulation destination. In this case, if the determination result in step SE5 is "Yes", in step SE6, the circulation controller 650 requests of the transmission processor 660 that the distribution communication block 800 is transmitted to the next client $600_2$.

In this manner, in step A5 shown in FIG. 10, the transmission processor 660 transmits the distribution communication block 800 to the client $600_2$ through the LAN 500. In parallel to the transmission operation, in step SD4 shown in FIG. 8, the collection and distribution controller 620 determines whether a client in which the collection and distribution controller 620 is incorporated is the relay client 400 or not. In this case, the determination result is set to be "No".

Thereafter, in steps subsequent to step A6 shown in FIG. 10, by the same operation as described above, copying of distribution information, setting of a result, and transmission (circulation) of the distribution communication block 800 to a client which is the next circulation destination are sequentially performed. When the distribution communication block 800 is received by the client $600_n$ which is the final circulation destination, in step A8, the client $600_n$ copies distribution information and sets a result in the same operation as described above. In step A9, the client $600_n$ transmits the distribution communication block 800 to the relay client 400 through the LAN 500.

When the distribution communication block 800 is received by the reception processor 470 of the relay client 400 in step SD7 shown in FIG. 8, the collection and distribution controller 420 sets the determination result in step SD4 to be "Yes", and then gives the distribution communication block 800 to the transmission processor 480 in step SD5. In this manner, in step A10 shown in FIG. 10, the transmission processor 480 transmits the distribution communication block 800 to the server 100 through the Internet 200. In addition, the collection and distribution controller 420 sets the determination result in step SD6 to be "Yes" to end the series of processes.

When the distribution communication block 800 is received by the reception processor 180 of the server 100, in step SB3 shown in FIG. 6, the collection and distribution controller 130 calls the result management unit 190. In this manner, in step SC1 shown in FIG. 7, the result management unit 190 receives the distribution communication block 800. In step SC2, the result management unit 190 decides the type of the collection and distribution ID 720 (see FIG. 3) of the distribution communication block 800.

In this case, since the collection and distribution ID 720 is a collection and distribution ID for normal collection and distribution, in step SC3, the result management unit 190 holds results of distribution (normal or abnormal) with reference to result management information regions 478, to 478, of the pieces of circulation destination information $742_0$ to $742_n$ of the distribution communication block 800. In step SC4, the result management unit 190 increments a result distributed counter (not shown) by the number of times which the results are normal.

As a result, the result distributed counter is to count clients to which pieces of information are normally distributed in the series of distribution processes for the relay client 400 and the clients $600_1$ to $600_n$. In this case, the count value of the result distributed counter is set at n+1. More specifically, the pieces of distribution information are distributed to all the relay client 400 and the clients $600_1$ to $600_n$.

In step SC5, the result management unit 190 determines whether the count result (in this case, n+1) of the result distributed counter is equal to the number of all clients (in this case, n+1) or not. In this case, the determination result is set to be "Yes" to end the series of processes. When the collection and distribution ID 720 is a collection and distribution ID for canceling, in step SC6, the result management unit 190 clears the result of distribution set in the result management information region of the distribution communication block.

A collection operation in Operational Example 1 of the first embodiment will be described below with reference to FIG. 5 to FIG. 9 and FIG. 11. In the following description, a case in which pieces of collection information are collected from the relay client 400 and the clients $600_1$ to $600_n$ by a circulation system using the collection communication block 900 shown in FIG. 4. In step SB1 shown in FIG. 6, the collection and distribution controller 130 of the server 100 calls the communication block forming unit 150.

In this case, when collection processing is designated by the collection and distribution controller 130, in step SA6 shown in FIG. 5, the communication block forming unit 150 forms the collection communication block 900 formed from the basic communication block 700 (see FIG. 2) and shown in FIG. 4, and then sets the collection and distribution ID 720 for normal collection and distribution in the collection communication block 900.

In step SA7, the communication block forming unit 150, as destinations of circulation using the collection communication block 900, all the relay client 400 and the clients $600_1$ to $600_n$ shown in FIG. 1 are set. In step SA4, the communication block forming unit 150 determines whether distribution processing is performed by the control of the collection and distribution controller 130 or not. In this case, since collection processing is performed, the communication block forming unit 150 sets the determination result to be "No" and gives the formed collection communication block 900 to the collection and distribution controller 130.

In this manner, in step SB2 shown in FIG. 6, the collection and distribution controller 130 gives the collection communication block 900 formed by the communication block forming unit 150 to the transmission processor 170 to make a transmission request. In this manner, in step B1 shown in FIG. 11, the transmission processor 170 of the server 100 transmits the collection communication block 900 to the relay client 400 through the Internet 200.

When the collection communication block 900 is received by the reception processor 410 of the relay client 400 shown in FIG. 1, in step B2, the relay client 400 sets collection information in the collection information region 780 of the collection communication block 900 shown in FIG. 4, and sets a result of collection (in this case, normal) in the result management information region $748_0$.

More specifically, in step SD1 shown in FIG. 8, the collection and distribution controller 420 of the relay client 400 calls the reception processor 410 to cause the reception processor 410 to receive the collection communication block 900. In step SD2, the collection and distribution controller 420 calls the data processor 430 to cause the data processor 430 to perform data processing to the collection communication block 900. In this manner, the data processor 430 sets collection information in the collection information region 780 of the collection communication block 900 shown in FIG. 4.

In step SD3, the circulation controller 450 is called. In this manner, in step SE1 shown in FIG. 9, the circulation controller 450 sets collection information in the collection information 783, shown in FIG. 4, and sets "normal" as a result of collection in the result management information region $748_0$. In step SE2, the circulation controller 450 refers to the circulation information region 740 shown in FIG. 4 and refers to the next circulation destination information 7421. The circulation destination information $742_1$ is information related to the client $600_1$ which is the next circulation destination.

In step SE3, the circulation controller 450 determines whether "uncollected" is set in the collection and distribution management flag $746_1$ of the circulation destination information $742_1$ which is referred to in step SE2. In this case, the determination result is set to be "Yes". In step SE4, the circulation controller 450 determines whether the collection communication block 900 can be transmitted to the client $600_1$ which is the next circulation destination. In this case, the determination result is set to be "Yes". If the determination result in step SE4 is "No", in step SE7, the circulation controller 450 waits a predetermined period of time on the basis of time measurement by the timer.

In step SE5, the circulation controller 450, for example, uses a ping command or the like to determine whether the client $600_1$ which is the next circulation destination operates or not. If the determination result is "No", the circulation controller 450 executes processing subsequent to step SE2 related to the client $600_2$ which is the next circulation destination. In this case, if the determination result in step SE5 is "Yes", in step SE6, the circulation controller 450 requests of the transmission processor 460 that the collection communication block 900 is transmitted to the next client $600_1$.

Figure 11:
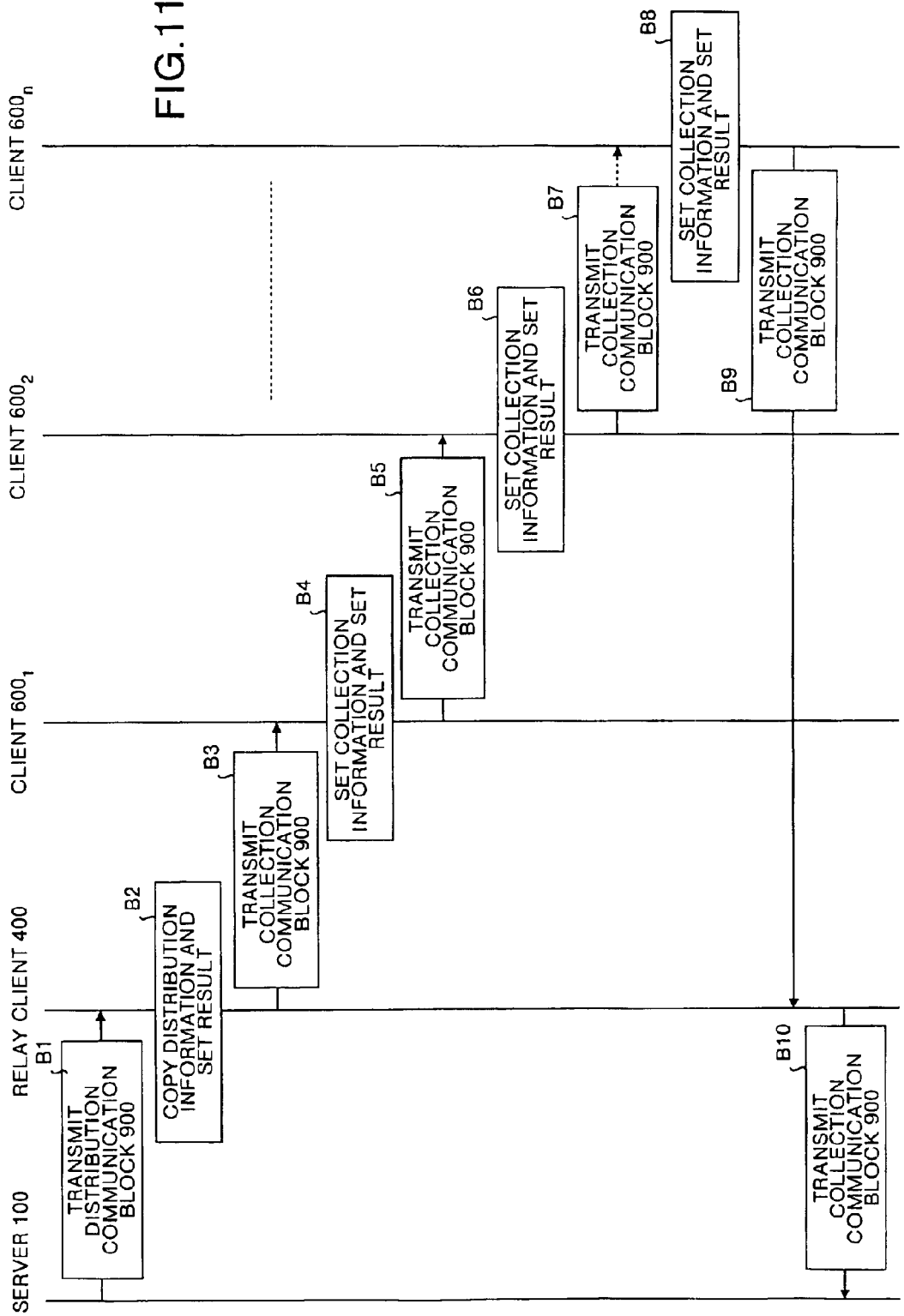
FIG. 11 is a sequence diagram for explaining a distribution operation in Operational Example 1 of the first embodiment.
Figure 12:
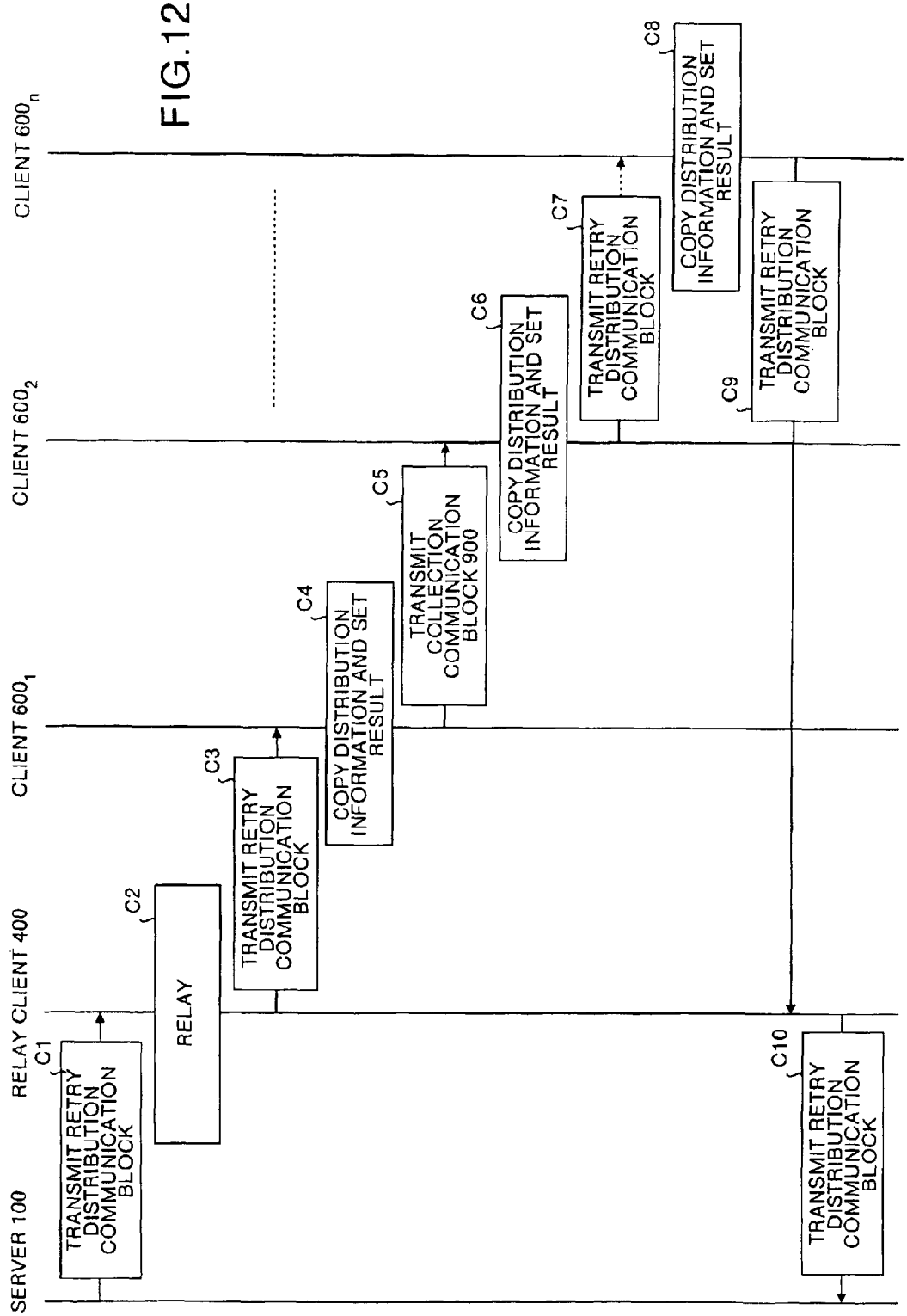
FIG. 12 is a sequence diagram for explaining a retry distribution operation in Operational Example 1 of the first embodiment.

In this manner, in step B3 shown in FIG. 11, the transmission processor 460 transmits the collection communication block 900 to the client 600 through the LAN 500. In parallel to the transmission operation, in step SD4 shown in FIG. 8, the collection and distribution controller 420 determines whether a client in which the collection and distribution controller 420 is incorporated is the relay client 400 or not. In this case, the determination result is set to be "Yes". In step SD5, the collection and distribution controller 420 calls the transmission processor 480. At this time, any information is not transmitted from the transmission processor 480.

In step SD6, the collection and distribution controller 420 transmits the collection communication block 900 to the server 100 to determine whether a status of collection is notified or not. In this case, the determination result is set to be "No". In step SD7, the collection and distribution controller 420 calls the reception processor 470. In this manner, the reception processor 470 is set in a reception waiting state. Subsequently, the loop of step SD4 to SD7 is repeated.

When the collection communication block 900 is received by the reception processor 610 of the client $600_1$, in step B4, as in step B2, the client $600_1$ sets collection information in the collection information region 780 of the collection communication block 900 shown in FIG. 4 and sets a result of collection in the result management information region $748_1$.

More specifically, in step SD1 shown in FIG. 8, the collection and distribution controller 620 of the client $600_1$ calls the reception processor 610 to cause the reception processor 610 to receive the collection communication block 900. In step SD2, the collection and distribution controller 620 calls the data processor 630 to cause the data processor 630 to perform data processing to the collection communication block 900. In this manner, the data processor 630 sets collection information in the collection information region 780 of the collection communication block 900 shown in FIG. 4.

In step SD3, the circulation controller 650 is called. In this manner, in step SE1 shown in FIG. 9, the circulation controller 650 sets "collected as a result of collection in the result management information region $748_0$ shown in FIG. 4. In step SE2, the circulation controller 650 refers to the circulation information region 740 shown in FIG. 4 and refers to the next circulation destination information (not shown). The circulation destination information is information related to the client $600_2$ which is the next circulation destination.

In step SE3, the circulation controller 650 determines whether "uncollected" is set as the collection and distribution flag $746_1$ of the circulation destination information which is referred to in step SE2. In this case, the determination result is set to be "Yes". In step SE4, the circulation controller 650 determines whether the collection communication block 900 can be transmitted to the client $600_2$ which is the next circulation destination. In this case, the determination result is set to be "Yes". If the determination result in step SE4 is "No", in step SE7, the circulation controller 650 waits a predetermined period of time on the basis of time measurement by the timer.

In step SE5, the circulation controller 650, for example, uses a ping command or the like to determine whether the client 600Z which is the next circulation destination operates or not. If the determination result is "No", the circulation controller 650 executes processing subsequent to step SE2 related to the client $600_3$ which is the next circulation destination. In this case, if the determination result in step SE5 is "Yes", in step SE6, the circulation controller 650 requests of the transmission processor 660 that the collection communication block 900 is transmitted to the next client $600_2$.

In this manner, in step B5 shown in FIG. 11, the transmission processor 460 transmits the collection communication block 900 to the client 6002 through the LAN 500. In parallel to the transmission operation, in step SD4 shown in FIG. 8, the collection and distribution controller 620 determines whether a client in which the collection and distribution controller 620 is incorporated is the relay client 400 or not. In this case, the determination result is set to be "No".

Thereafter, in steps subsequent to step B6 shown in FIG. 11, by the same operation as described above, setting of collection information, setting of a result, and transmission (circulation) of the collection communication block 900 to a client which is the next circulation destination are sequentially performed. When the collection communication block 900 is received by the client $600_n$ which is the final circulation destination, in step B8, the client $600_n$ performs setting of collection information and setting of a result by the same operation as described above. In step B9, the client $600_n$ transmits the collection communication block 900 to the relay client 400 through the LAN 500.

When the collection communication block 900 is received by the reception processor 470 of the relay client 400 in step SD7 shown in FIG. 8, the collection and distribution controller 420 sets the determination result in step SD4 to be "Yes", and then gives the collection communication block 900 to the transmission processor 480 in step SD5. In this manner, in step B10 shown in FIG. 11, the transmission processor 480 transmits the collection communication block 900 to the server 100 through the Internet 200. In addition, the collection and distribution controller 420 sets the determination result in step SD6 to be "Yes" to end the series of processes.

When the collection communication block 900 is received by the reception processor 180 of the server 100, in step SB3 shown in FIG. 6, the collection and distribution controller 130 calls the result management unit 190. In this manner, in step SC1 shown in FIG. 7, the result management unit 190 receives the collection communication block 900. In step SC2, the result management unit 190 decides the type of the collection and distribution ID 720 (see FIG. 4) of the collection communication block 900.

In this case, since the collection and distribution ID 720 is a collection and distribution ID for normal collection and distribution, in step SC3, the result management unit 190 holds results of distribution (collected or uncollected) with reference to result management information regions $478_0$ to $478_n$ of the pieces of circulation destination information $742_0$ to $742_n$ of the collection communication block 900. In step SC4, the result management unit 190 increments a result distributed counter by the number of times which the results are collected.

In this case the count value of the result collected counter is set to be n+1. More specifically, pieces of collection information are normally collected from all the relay client 400 and the clients $600_1$ to $600_n$. In step SC5, the result management unit 190 determines whether the count result (in this case, n+1) of the result collected counter is equal to the number of all clients (in this case n+1). In this case, the determination result is set to be "Yes" to end the series of processes.

In the distribution operation described with reference to FIG. 10, if the determination result of step SC5 shown in FIG. 7 is "No", that is, if a result of distribution of the relay client 400 and the clients $600_1$ to $600_n$ is "abnormal", a retry distribution operation (see FIG. 12) which distribution information is distributed to the abnormal" client again is performed.

More specifically, when the communication block forming unit 150 is called by the collection and distribution controller 130 of the server 100 in step SB1 shown in FIG. 6, in step SA1 shown in FIG. 5, the communication block forming unit 150 determines a processing type (normal collection and distribution processing, retry distribution processing, and cancel processing).

In this case, it is assumed that the retry distribution processing is designated by the collection and distribution controller 130. At this time, in step SA2, the communication block forming unit 150 forms a retry distribution communication block (not shown) shown in FIG. 3 from the basic communication block 700 (see FIG. 2), and then sets the collection and distribution ID 720 for retry in the retry distribution communication block. The basic data structure of the retry distribution communication block is the same as that of the distribution communication block 800 (see FIG. 3). Therefore, the retry distribution communication block will be described below with reference to the distribution communication block 800.

In step SA3, the communication block forming unit 150 resets a circulation destination information a result of distribution of which is "abnormal" in the circulation destination information $742_0$ to $742_n$ shown in FIG. 3. In this case, it is assumed that the results of distribution related to the relay client 400 and the clients $600_3$ to $600_{n-1}$ (not shown) are "normal". On the other hand, it is assumed that the results of distribution of the clients $600_1$, $600_2$, and $600_n$ are "abnormal".

In step SA4, the communication block forming unit 150 determines whether (retry) distribution processing is performed by the control of the collection and distribution controller 130 or not. In this case, the decision result is set to be "Yes". In step SA5, the communication block forming unit 150 sets distribution information in the distribution information region 760 shown in FIG. 3, and gives a formed retry distribution communication block to the collection and distribution controller 130.

In this manner, in step SB2 shown in FIG. 6, the collection and distribution controller 130 calls the transmission processor 170. More specifically, the collection and distribution controller 130 gives a retry distribution communication block formed by the communication block forming unit 150 to the transmission processor 170 to make a transmission request. In this manner, in step C1 shown in FIG. 12, the transmission processor 170 of the server 100 transmits the retry distribution communication block to the relay client 400 through the Internet 200.

When the retry distribution communication block is received by the reception processor 410 of the relay client 400 shown in FIG. 1, in step C2, the relay client 400 relays the retry distribution communication block to the client $600_1$. More specifically, in step C3, since the relay client 400 has received distribution information, the retry distribution communication block is transmitted to the client $600_1$ (abnormal).

When the retry distribution communication block is received by the client $600_1$, in step C4, the client $600_1$ copies distribution information set in the distribution information region 760 of the retry distribution communication block shown in FIG. 3 and sets a result of distribution in the result management information region $748_1$. In step C5, the client $600_1$ transmits the retry distribution communication block to the client $600_2$ (abnormal).

When the retry distribution communication block is received by the client $600_2$, in step C6, the client $600_2$ copies distribution information set in the distribution information region 760 of the retry distribution communication block shown in FIG. 3 and sets a result of distribution in the result management information region $748_1$. In step C6, the client 6002 transmits the retry distribution communication block to the client $600_n$ (abnormal).

When the retry distribution communication block is received by the client $600_n$, in step C8, the client $600_n$ performs copying of distribution information and setting of a result by the same operation as described above. In step C9, the client $600_n$ transmits the retry distribution communication block to the relay client 400 through the LAN 500.

When the retry distribution communication block is received by the relay client 400 in step SD7 shown in FIG. 8 in step C10, the collection and distribution controller 420 causes the relay client 400 to the server 100 transmit the retry distribution communication block to through the Internet 200.

When the retry distribution communication block is received by the reception processor 180 of the server 100, in the result management unit 190, processing related to the retry distribution communication block is executed according to the flow chart shown in FIG. 7. Although the retry distribution operation has been described above, a retry operation may be performed in case of collection by the same operation as the retry distribution operation.

In Operational Example 1 of the first embodiment described above, the following example has been described. That is, in a distribution operation (see FIG. 10) or a collection operation (see FIG. 11), when the distribution communication block 800 or the collection communication block 900 is received by the client $600_n$ which is the final circulation distribution, the distribution communication block 800 or the collection communication block 900 is transmitted to the server 100 through the relay client 400, so that a result of collection and distribution is notified. However, the result of collection and distribution is intermediately notified in the middle of collection and distribution. This case will be described below as Operational Example 2 of the first embodiment.

Operational Example 2 of the first embodiment will be described below with reference to FIGS. 13 and 14. FIG. 14 is a sequence diagram for explaining a distribution operation in Operational Example 2 of the first embodiment. A collection operation which performs intermediate notification is also performed by the same manner as that of the distribution operation (to be described later).

In step D1 shown in FIG. 14, the server 100 transmits the distribution communication block 800 to the relay client 400 through the Internet 200. When the distribution communication block 800 is received by the relay client 400 shown in FIG. 1, in step D2, the relay client 400 copies distribution information set in the distribution information region 760 of the distribution communication block 800 and sets a result of distribution in the result management information region $748_0$ as in Operational Example 1.

Figure 13:
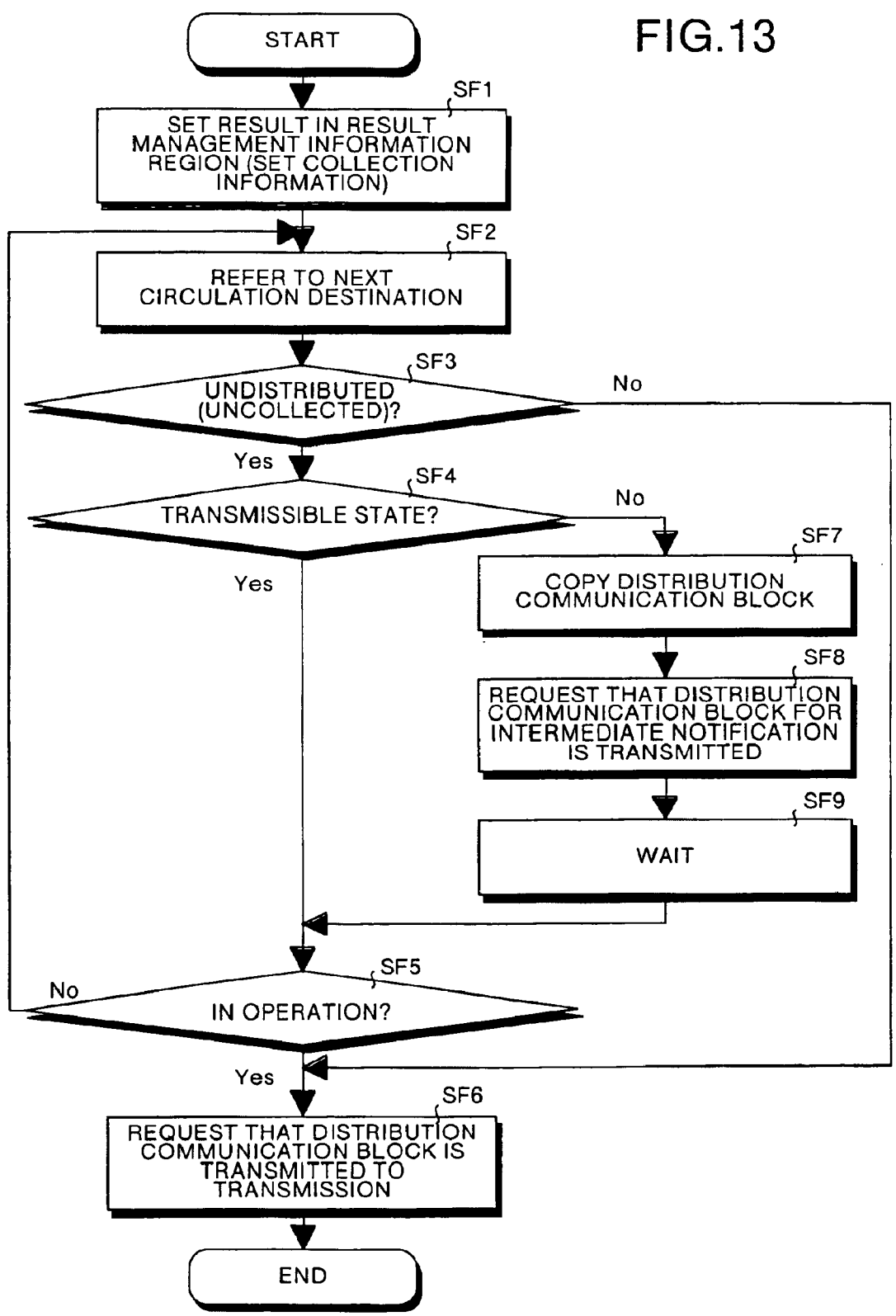
FIG. 13 is a flow chart for explaining an operation of a circulation controller in Operational Example 2 of the first embodiment.
Figure 14:
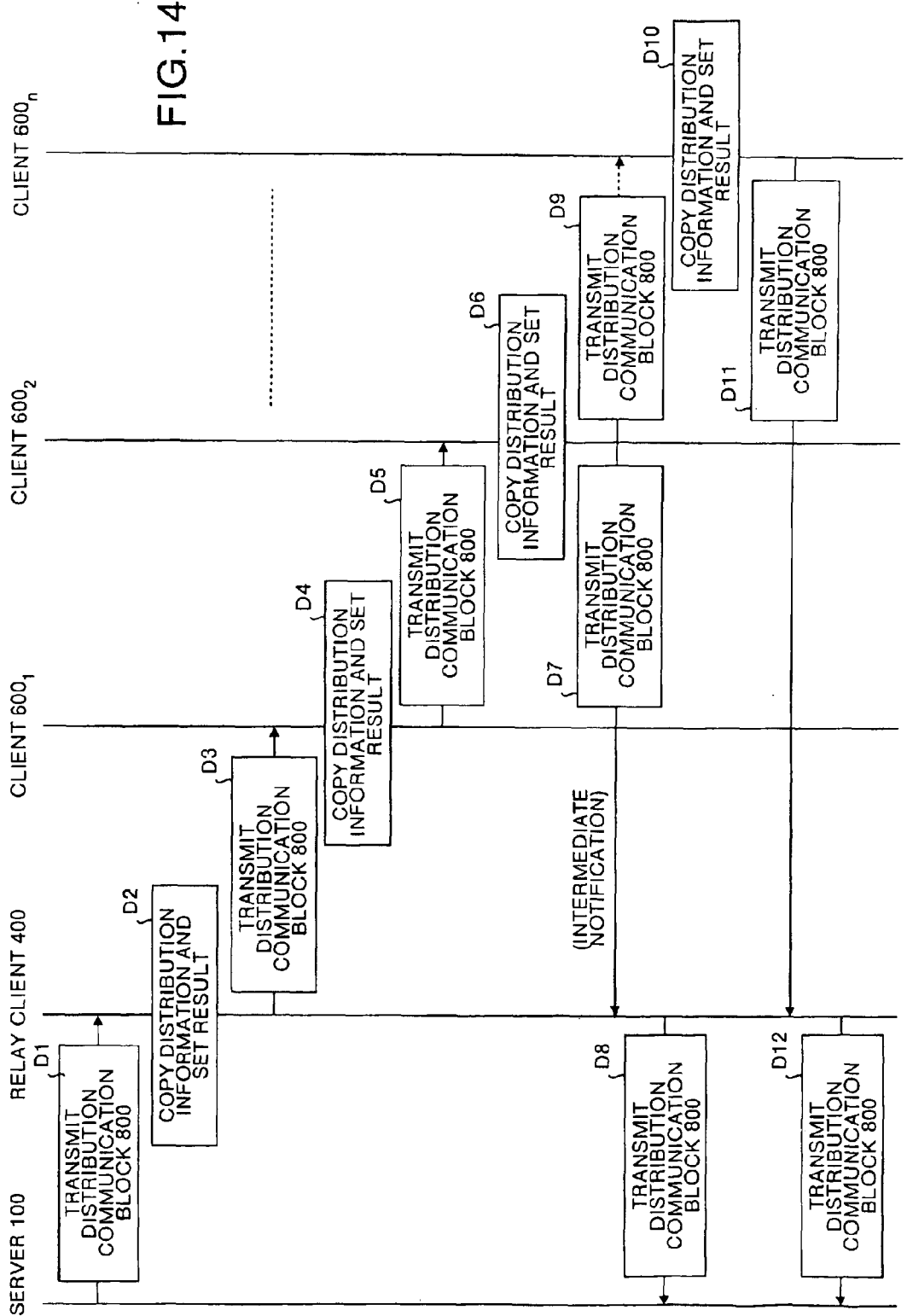
FIG. 14 is a sequence diagram for explaining a distribution operation in Operational Example 2 of the first embodiment.

More specifically, in step SF1 shown in FIG. 13, the circulation controller 450 of the relay client 400 sets "normal" as a result of distribution in the result management information region $748_0$ shown in FIG. 3. In step SF2, the circulation controller 450 refers to the circulation information region 740 shown in FIG. 3 and refers to the next circulation destination information $742_1$. In step SF3, the circulation controller 450 determines whether "undistributed" in the collection and distribution management flag $746_1$ of the circulation destination information $742_1$ which is referred to in step SF2 or not. In this case, the determination result is set to be "Yes".

In step SF4, the circulation controller 450 determines whether the distribution communication block 800 is transmitted to the client $600_1$ which is the next circulation destination or not. In this case, the determined result is set to be "Yes". In step SF5, the circulation controller 450 uses, for example, uses a ping command or the like to determine whether the client $600_1$ which is the next circulation destination operates or not. In this case, the determination result is set to be "Yes".

In step SF6, the circulation controller 450 requests of the transmission processor 460 that the distribution communication block 800 is transmitted to the next client 6001. In this manner, in step D3 shown in FIG. 14, the transmission processor 460 transmits the distribution communication block 800 to the client $600_1$ through the LAN 500.

When the distribution communication block 800 is received by the reception processor 610 of the client $600_1$, in step D4 shown in FIG. 14, the client $600_1$ copies distribution information set in the distribution information region 760 of the distribution communication block 800 shown in FIG. 3 and sets a result of distribution in the result management information region $748_1$. In step D5, the client $600_1$ transmits the distribution communication block 800 to the client $600_2$ through the LAN 500.

When the distribution communication block 800 is received by a reception processor (not shown) of the client $600_2$, in step D6, the client $600_2$ copies distribution information set in the distribution information region 760 of the distribution communication block 800 shown in FIG. 3 and sets a result of distribution in the result management information region 7482 (not shown).

More specifically, in step SF1 shown in FIG. 13, the circulation controller (not shown) of the client $600_2$ sets "normal" as a result of distribution in the result management information region of the distribution communication block 800. In step SF2, the circulation controller 650 refers to the circulation information region 740 shown in FIG. 3 and refers to next circulation destination information (not shown). This circulation destination information is information related to the client $600_3$ (not shown) which is the next circulation destination.

In step SF3, the circulation controller determines whether "undistributed" in the collection and distribution management flag of the circulation destination information which is referred to in step SF2 or not. In this case, the determination result is set to be "Yes". In step SF4, the circulation controller determines whether the distribution communication block 800 can be transmitted to the client $600_3$ (not shown) which is the next circulation destination. In this case, if the client $600_3$ is defective, the circulation controller sets the determination result in step SF4 to be "No".

In step SF7, the circulation controller copies the distribution communication block 800. In step SF8, the circulation controller requests of the transmission processor 460 that the distribution communication block 800 for intermediate notification is transmitted to the relay client 400. In this manner, in step SD7 shown in FIG. 14, the transmission processor of the client $600_2$ transmits the distribution communication block 800 for intermediate notification to the relay client 400 through the LAN 500.

When the distribution communication block 800 for intermediate notification is received by the relay client 400, in step D8, the relay client 400 transmits the distribution communication block 800 to the server 100 through the Internet 200. In this manner, intermediate notification of a result of distribution is performed to the server 100 through the operation described above.

In step SF9 shown in FIG. 13, the circulation controller of the client $600_2$ waits a predetermined period of time. In step SF5, the circulation controller, for example, uses a ping command or the like to determine whether the client $600_3$ which is the next circulation destination operates or not. In this case, the determination result is set to be "No", the circulation controller executes processes subsequent to step SF2 related to the client $600_4$ which is the next circulation destination.

In this case, if the determination result in step SF5 is "Yes", in step SF6, the circulation controller requests of the transmission processor that the distribution communication block 800 is transmitted to the client $600_3$. Thereafter, in step D9 to step D12 shown in FIG. 14, the same processes as those in step A7 to step A10 shown in FIG. 10 are performed.

Figure 15:
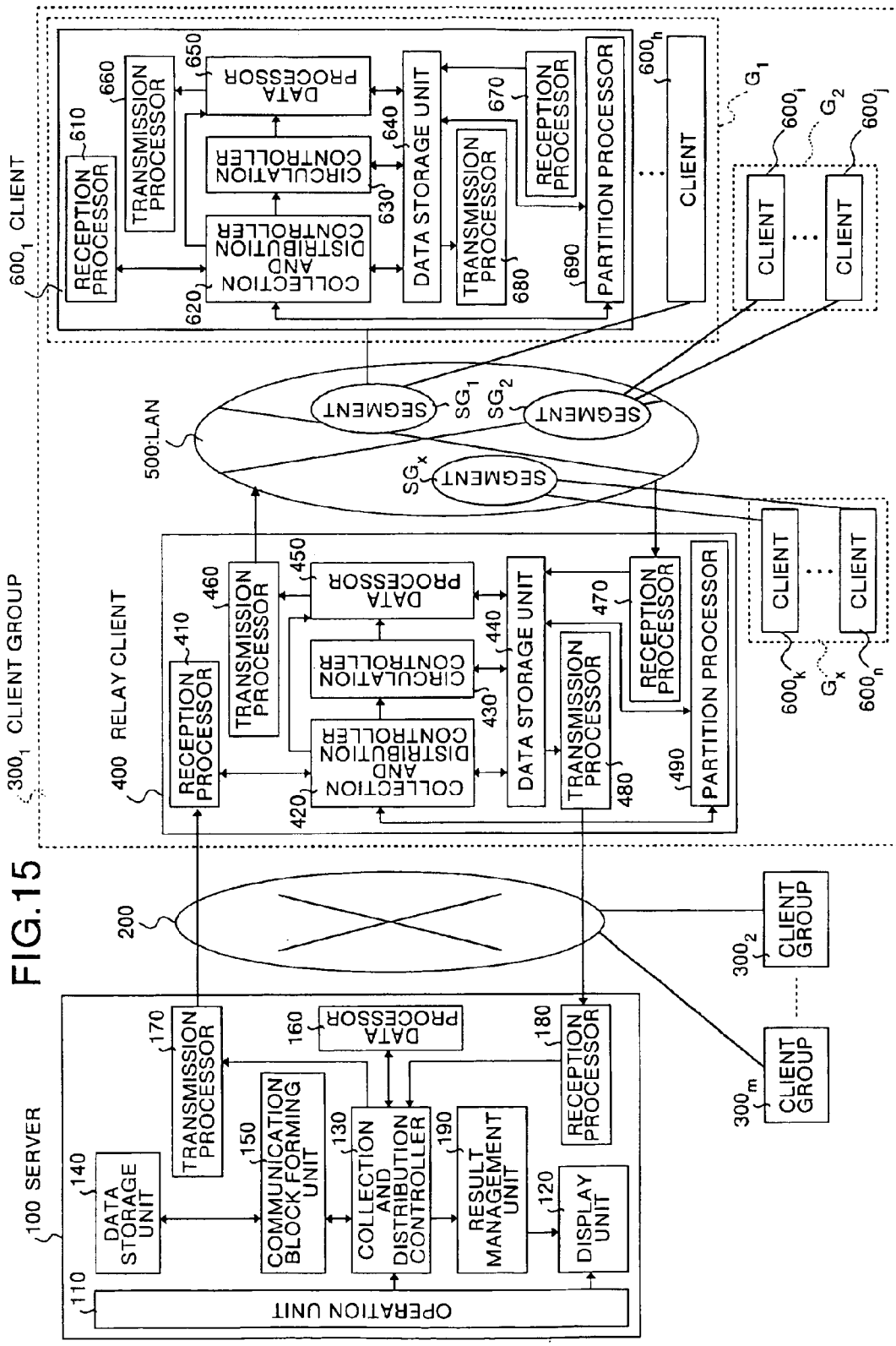
FIG. 15 is a block diagram for explaining Operational Example 3 of the first embodiment.

In Operational Example 1 of the first embodiment described above, the case in which one distribution communication block 800 (or collection communication block 900) is transmitted to one group constituted by the relay client 400 shown in FIG. 1 and the clients $600_1$ to $600_n$ has been explained. However, as shown in FIG. 15, the relay client 400 and the clients $600_1$ to $600_n$ may be partitioned into groups $G_1$ to $G_x$, and collection and distribution may be performed to each group. This case will be described below as Operational Example 3 of the first embodiment.

The group $G_1$ shown in FIG. 15 is constituted by clients $600_1$ to $600_h$ belonging to a segment $SG_1$ of the LAN 500. A group $G_2$ is constituted by clients $600_i$ (i>h) to $600_j$ (J>) belonging to a segment $SG_2$. A group $G_x$ is constituted by clients $600_k$ (k>J) to $600_n$ (n>k) belonging to a segment $SG_x$. In this example, the number of partitions (the number of groups) of a relay client 400 and the clients $600_1$ to $600_n$ is x.

Figure 18:
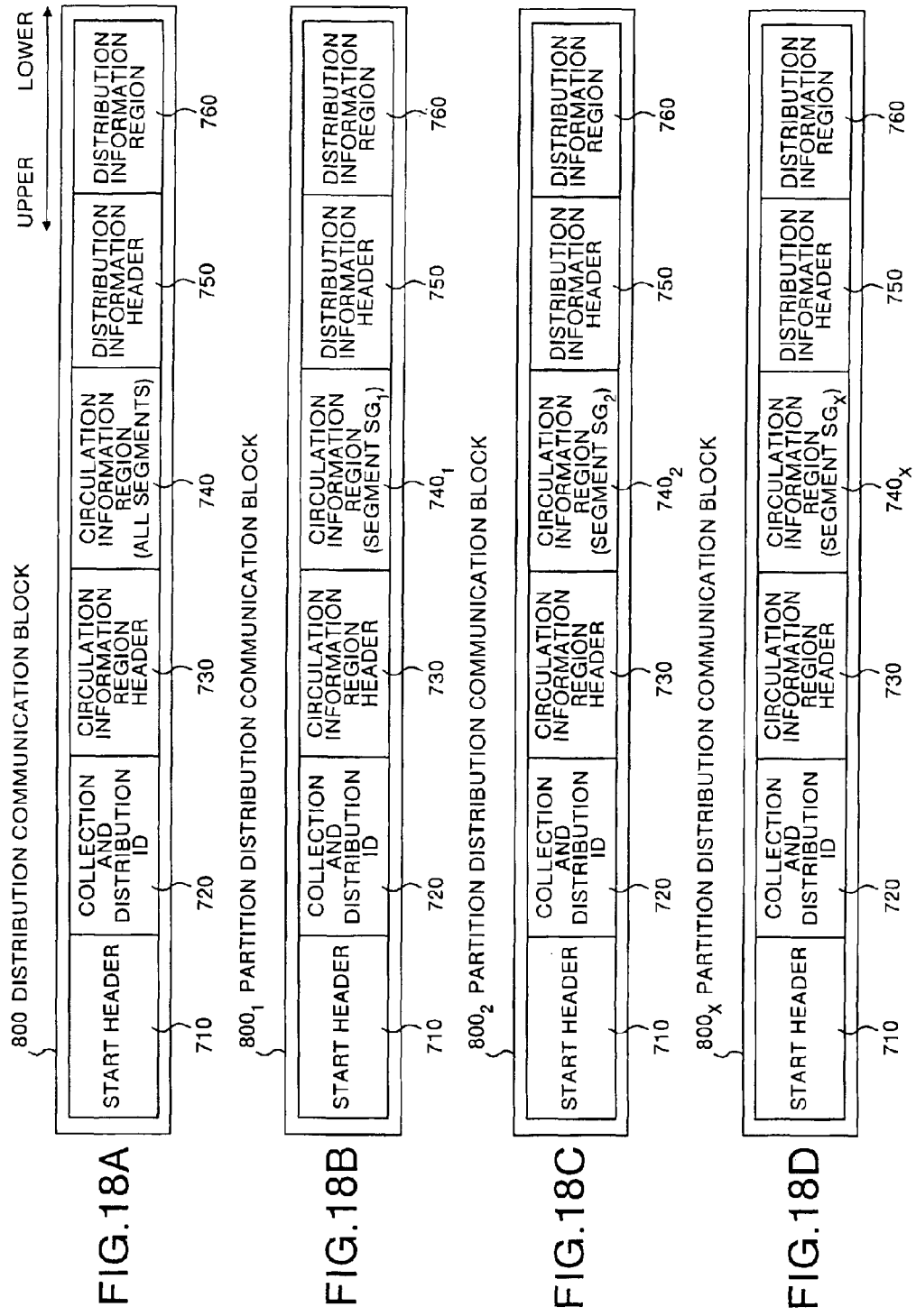
FIG. 18A to FIG. 18D are diagrams showing the data structures of partitioned distribution communication blocks $800_1$ to $800_x$ used in Operational Example 3 of the first embodiment.
Figure 19:
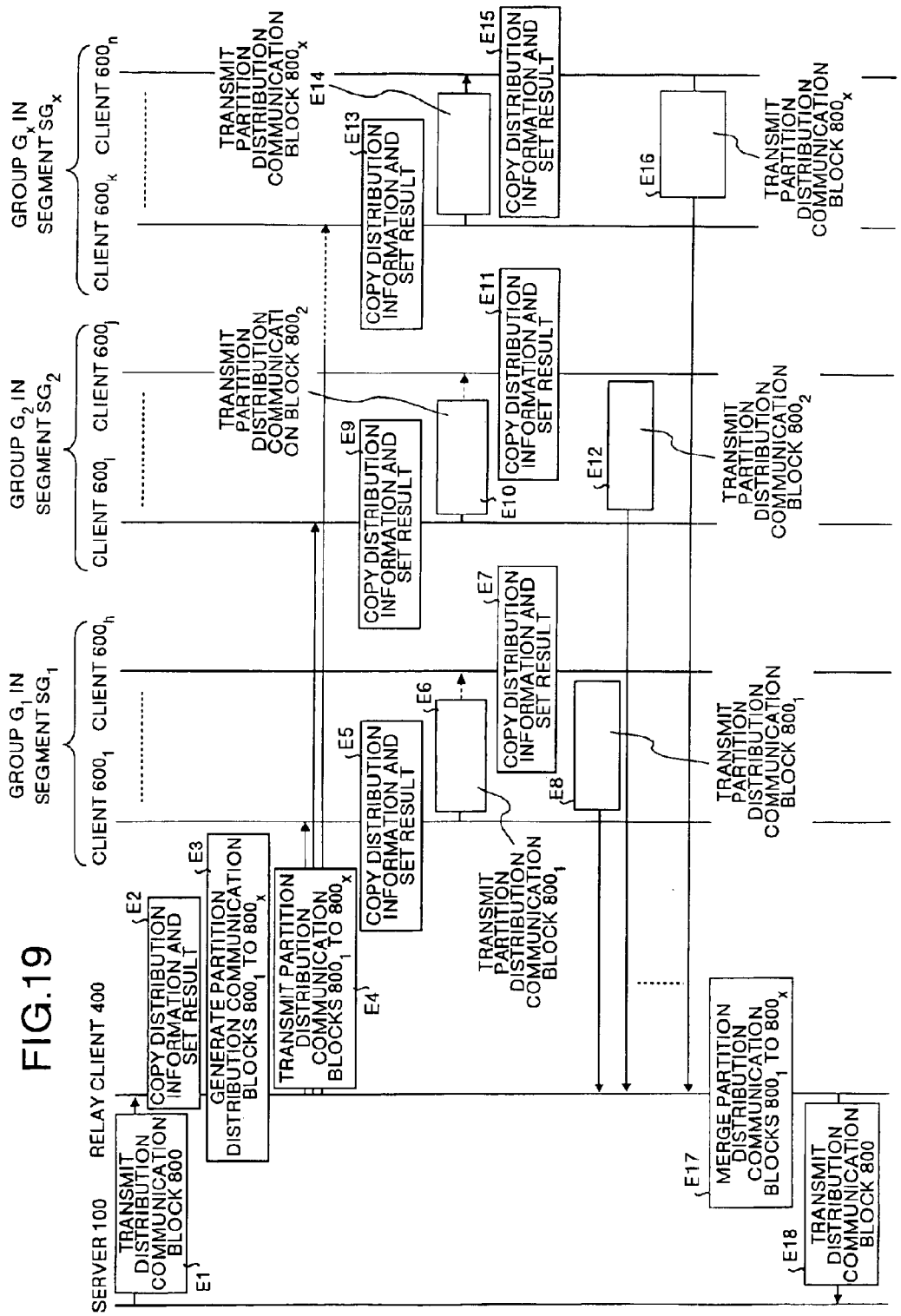
FIG. 19 is a sequence diagram for explaining a partitioned distribution operation in Operational Example 3 of the first embodiment.

In the arrangement described above, when the distribution communication block 800 (see FIG. 18A) is formed by the communication block forming unit 150 of the server 100 shown in FIG. 15, in step E1 shown in FIG. 19, the transmission processor 170 of the server 100 transmits the distribution communication block 800 to the relay client 400 through the Internet 200.

When the distribution communication block 800 is received by the reception processor 410 of the relay client 400 shown in FIG. 1, in step E2, the relay client 400 copies distribution information and sets the result of distribution. In step E3, the relay client 400 forms partition distribution communication blocks $800_1$ to $800_n$ shown in FIG. 18B to FIG. 18D.

More specifically, the collection and distribution controller 420 of the relay client 400 calls the data processor 430 to cause the data processor 430 to perform data processing to the distribution communication block 800. In this manner, the data processor 430 copies distribution information set in the distribution information region 760 of the distribution communication block 800 shown in FIG. 18A, and then stores the copy in the data storage unit 440.

The collection and distribution controller 420 calls the circulation controller 450. In this manner, in step SG1 shown in FIG. 16, the circulation controller 450 of the relay client 400 determines whether partition distribution is designated by the collection and distribution controller 420 or not. If the determination result is "No", in step SG16, the circulation controller 450 executes normal distribution processing which is the same as that in Operational Example 1 of the first embodiment. In step SG17, the circulation controller 450 calls the reception processor 470.

In this case, when partition distribution is designated by the collection and distribution controller 420, in step SG2, the circulation controller 450 sets "normal" as a result of distribution in the result management information region $748_0$ shown in FIG. 3. The process in step SG1 is the same as the process in step SE1 (see FIG. 9). In step SG3, the circulation controller 450 calls the partition processor 490.

Figure 17:
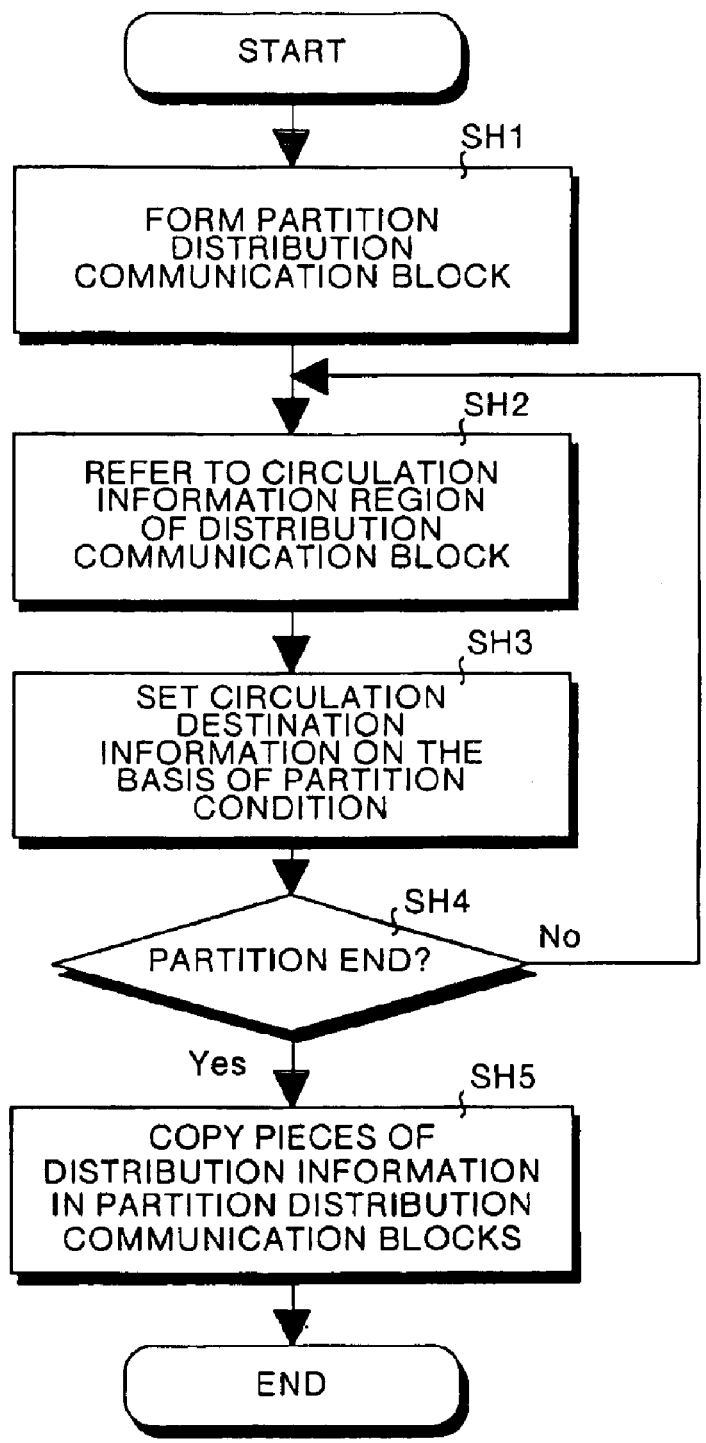
FIG. 17 is a flow chart for explaining an operation of a partition processor 490 shown in FIG. 1.

In this manner, in step SH1 shown in FIG. 17, the partition processor 490 forms the partition distribution communication blocks $800_1$ to $800_x$ shown in FIGS. 18B to 18D from the distribution communication block 800 shown in FIG. 18A by copy. Each of the data structures of the partition distribution communication blocks $800_1$ to $800_x$ is the same as the data structure of the distribution communication block 800. The partition distribution communication blocks $800_1$ to $800_x$ correspond to groups $G_1$ to $G_x$ belonging to segments $SG_1$ to $SG_x$ shown in FIG. 15. In step SG2, the partition processor 490 refers to the circulation information region 740 (see FIG. 3) of the distribution communication block 800.

In step SH3, the partition processor 490 sets circulation destination information in the circulation information region $740_1$ of the partition distribution communication block $800_1$ on the basis of a partition condition designated by the collection and distribution controller 420. The partition condition mentioned here is that the clients $600_1$ to $600_n$ shown in FIG. 15 are partitioned into groups $G_1$ to $G_x$. For this reason, in the circulation information region $740_1$ of the partition distribution communication block $800_1$ shown in FIG. 18B, pieces of circulation destination information (client names, addresses, and the like) related to the clients $600_1$ to $600_n$ in the group $G_1$ shown in FIG. 15.

In step SH4, the partition processor 490 determines whether partition is completed or not. In this case, the determination result is set to be "No". Thereafter, the processes in step SH2 and SH3 are repeated. In this manner, in the circulation information region $740_2$ of the partition distribution communication block $800_2$ (see FIG. 18C), pieces of circulation destination information (client names, addresses, and the like) related to clients $600_i$ to $600_j$ in the group $G_2$ are set. In the same manner as described above, pieces of circulation destination information (client names, addresses, and the like) related to the clients $600_k$ to $600_n$ in the group $G_x$ shown in FIG. 18D are set in the circulation information region $740_x$ of the partition distribution communication block $800_x$ (see FIG. 18D).

When the determination result in step SH4 becomes "Yes", the partition processor 490 copies the distribution information set in the distribution information region 760 (see FIG. 18A) of the distribution communication block 800 to the distribution information regions 760 of the partition distribution communication blocks $800_1$ to $800_x$, respectively.

Figure 16:
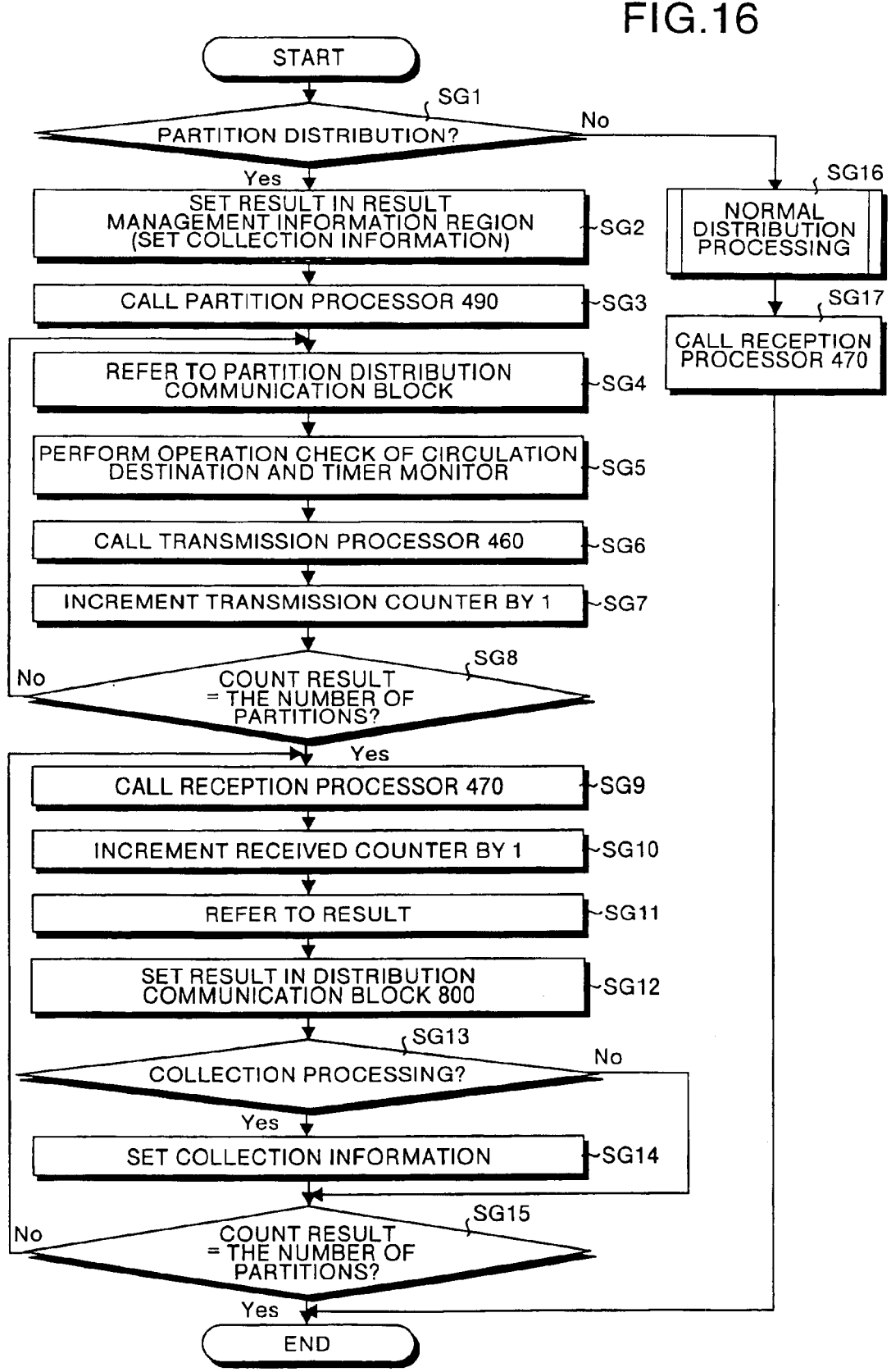
FIG. 16 is a flow chart for explaining an operation of a circulation controller 450 shown in FIG. 1.

In step SG4 shown in FIG. 16, the circulation controller 450 refers to the partition distribution communication block $800_1$ (see FIG. 18B). In step SG5, the circulation controller 450 checks the operation of a circulation destination (in this case, the client $600_1$) which is set first in the circulation information region $740_1$ to perform monitoring with a timer. In step SG5, the circulation controller 450 calls the transmission processor 460 and requests of the transmission processor 460 that the partition distribution communication block $800_1$ is transmitted to the client $600_1$. In this manner, the transmission processor 460 transmits the partition distribution communication block $800_1$ to the client $600_1$ through the LAN 500 (step E3: see FIG. 19).

In step SG7, the circulation controller 450 increments a transmission counter for counting the number of transmitted partition distribution communication blocks by 1. In step SG8, it is determined whether the count value of the transmission counter is equal to the number of partitions (in this case, x) or not. In this case, the determination result is set to be "No".

Thereafter, when the processes in step SG4 to step SG7 are repeated, the partition distribution communication blocks $800_2, \ldots, 800_x$ are transmitted from the transmission processor 460 of the relay client 400 to the clients $600_i, \ldots, 600_k$, respectively, (step E4: see FIG. 19). When the determination result in step SG8 becomes "Yes", in step SG9, the relay client 400 calls the reception processor 470 to set in a reception waiting state.

When the partition distribution communication block 8001 is received by the client $600_1$, in step E5 shown in FIG. 19, the client $600_1$ copies the distribution information set in the distribution information region 760 of the partition distribution communication block $800_1$ shown in FIG. 18B and sets a result of distribution in a result management information region (not shown). In step E6, the client $600_1$ transmits the partition distribution communication block $800_1$ to the client $600_2$.

Thereafter, the partition distribution communication block $800_1$ is sequentially circulated. When the partition distribution communication block $800_1$ is received by the client $600_h$ which is the final circulation destination in the group $G_1$, in step E7, the client $600_h$ copies the distribution information and sets a result. In step E8, the client $600_h$ transmits the partition distribution communication block $800_1$ to the relay client 400 through the LAN 500.

In parallel to the processes in steps E5 to E8 described above, the processes in step E9 to step E12 are executed in the group $G_2$, and the processes in step E13 to step E16 in the group $G_x$. In this manner, the partition distribution communication blocks $800_2$ and $800_x$ are transmitted from the clients $600_1$ and $600_x$ to the relay client 400.

When the partition distribution communication blocks $800_1$ to $800_x$ are received by the relay client 400, in step E17, the relay client 400 merges the partition distribution communication blocks $800_1$ to $800_x$. More specifically, the partition distribution communication block $800_1$ is received by the reception processor 470, in step SG10 shown in FIG. 16, the circulation controller 450 increments a received counter for counting received distribution communication blocks by 1.

In step SG11, the circulation controller 450 refers to a result of distribution related to the group $G_1$ from the circulation destination information $742_1$ (see FIG. 18B) of the partition distribution communication block $800_1$. In step SG12, the circulation controller 450 sets a result of distribution related to the group $G_1$ in the circulation information region 740 (see FIG. 18A) of the distribution communication block 800. In step SG13, the circulation controller 450 determines whether collection processing is performed or not. In this case, the determination is set to be "No". If the determination result in step SG13 is "No", in step SG14, the circulation controller 450 sets collection information related to the group $G_1$ in the collection communication block.

In step SG15, the circulation controller 450 determines whether the count result of the received counter is equal to the number of partitions (=x). In this case, the determination result is set to be "No". Thereafter, each time the partition distribution communication blocks $800_2$ to $800_x$ are received by the reception processor 470, the processes in step SG9 to step SG12 described above are executed. When merging related to all the partition distribution communication blocks $800_1$ to $800_x$ is completed, the circulation controller 450 sets the determination result in step SG15 to be "Yes".

In this manner, in step E18 shown in FIG. 19, the relay client 400 transmits the distribution communication block 800 (see FIG. 18A) to the server 100 through the Internet 200. Thereafter, as in Operational Example 1 of the first embodiment, result management (see FIG. 7) is executed by the result management unit 190.

As has been described above, according to the first embodiment, when the relaying function is given to the relay client 400, and circulation of all the distribution communication blocks 800 (or collection communication blocks 900) is completed, the distribution communication block 800 (or collection communication block 900) to the server 100 in which a distribution result (or collection result) is set is relayed through the relay client 400. For this reason, unlike a conventional technique, the dedicated server 40 (see FIG. 24) need not be arranged, and, by performing distribution once, the distribution communication block 800 (or collection communication block 900) may be transmitted from the LAN 500 to the Internet 200 once. For this reason, a network load can be reduced with a low cost and a high security.

According to the first embodiment, when the relaying function is given to the relay client 400, and circulation of all the distribution communication blocks 800 is completed, the distribution communication block 800 to the server 100 in which a distribution result is set is relayed through the relay client 400. For this reason, unlike a conventional technique, the dedicated server 40 (see FIG. 24) need not be arranged, and, by performing distribution once, the distribution communication block 800 may be transmitted from the LAN 500 to the Internet 200 once. For this reason, a network load can be reduced with a low cost and a high security.

In addition, according to the first embodiment, a client which fails in distribution (or collection) is recognized on the basis of a distribution result (or collection result) set in the distribution communication block 800 (or collection communication block 900) related to the first distribution (or collection), and a retry distribution communication block (or retry collection communication block) is retransmitted to the client. For this reason, reliability related to distribution (or collection) can be improved.

According to the first embodiment, when the client which is the next circulation destination is stopped in the middle of circulation of the distribution communication block 800 (or collection communication block 900), as intermediate notification, the distribution communication block 800 (or collection communication block 900) is relayed from the client to the server 100. For this reason, on the server 100 side, a distribution result (or collection result) can be quickly recognized without waiting for the distribution communication block 800 (or collection communication block 900) from the client $600_n$ which is the final circulation destination.

According to the first embodiment, the relay client 400 and the clients $600_1$ to $600_n$ are grouped into the groups $G_1$ to $G_x$, and communication blocks are circulated in each of the groups. For this reason, time required for distribution (or collection can be shortened.

Figure 20:
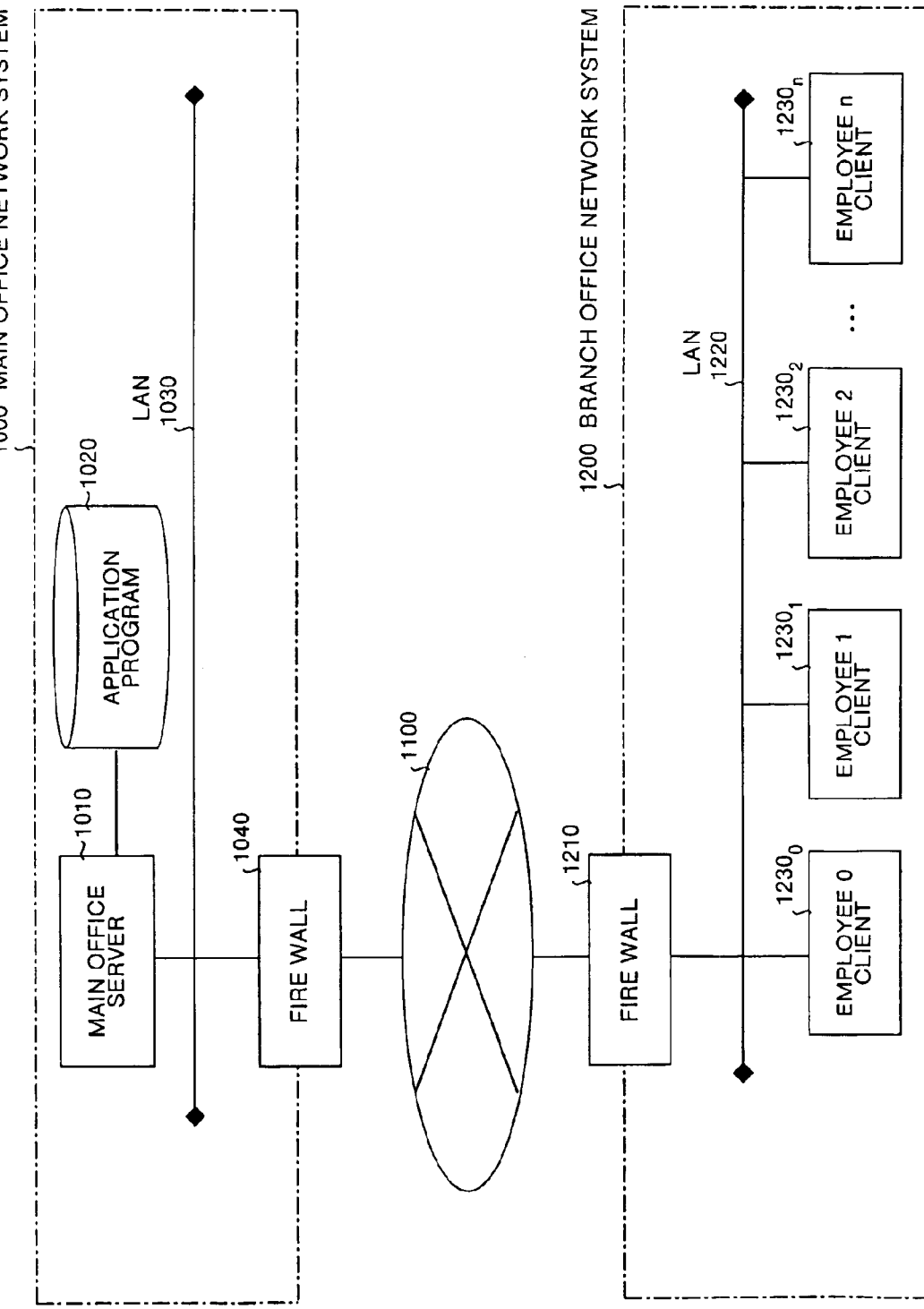
FIG. 20 is a block diagram showing the configuration of a second embodiment according to the present invention.

FIG. 20 is a block diagram showing the configuration of a second embodiment according to the present invention. The configuration of the second embodiment shown in FIG. 20 is the concrete example of the first embodiment described above. Therefore, the operation of the second embodiment is the same as the operation of the first embodiment.

In FIG. 20, a main office network system 1000 is an in-house system installed in a main office, and is constituted by a main office server 1010, a LAN 1030, and a fire wall 1040. The main office server 1010 has a function of distributing pieces of information (e.g., an application program 1020) to an employee 0 client $1230_0$ to an employee n client $1230_n$ and a function of collecting pieces of information from the employee 0 client $1230_0$ to the employee n client $1230_n$. The configuration and operation of the main office server 1010 are the same as the configuration and operation of the server 100 (see FIG. 1).

The main office server 1010 is connected to the LAN 1030. The fire wall 1040 is to prevent illegal access from an external system to the main office network system 1000, and is designed to cause only pieces of information or protocols to which securities are given to pass. The LAN 1030 is an in-house network installed in the main office, and is connected to Internet 1100 through the fire wall 1040.

A branch office network system 1200 is an in-house system installed in a branch office, and is constituted by a fire wall 1210, a LAN 1220, and an employee 0 client $1230_0$ to an employee n client $1230_n$. The fire wall 1210, like the fire wall 1040, is to prevent illegal access to the branch office network system 1200.

The LAN 1220 is an in-house network installed in a branch office, and is connected to the Internet 1100 through the fire wall 1210. The employee 0 client $1230_0$ to the employee n client $1230_n$ are computers corresponding to an employee 0 to an employee n (not shown) in the branch office, and are connected to the LAN 1220. The configuration and operation of the employee 0 client $1230_0$ are the same as the configuration and operation of the relay client 400 (see FIG. 1). The configuration and operation of the employee 1 client $1230_1$ to the employee n client $1230_n$ are the same as the configuration and operation of the clients $600_1$ to $600_n$ (see FIG. 1).

Figure 21:
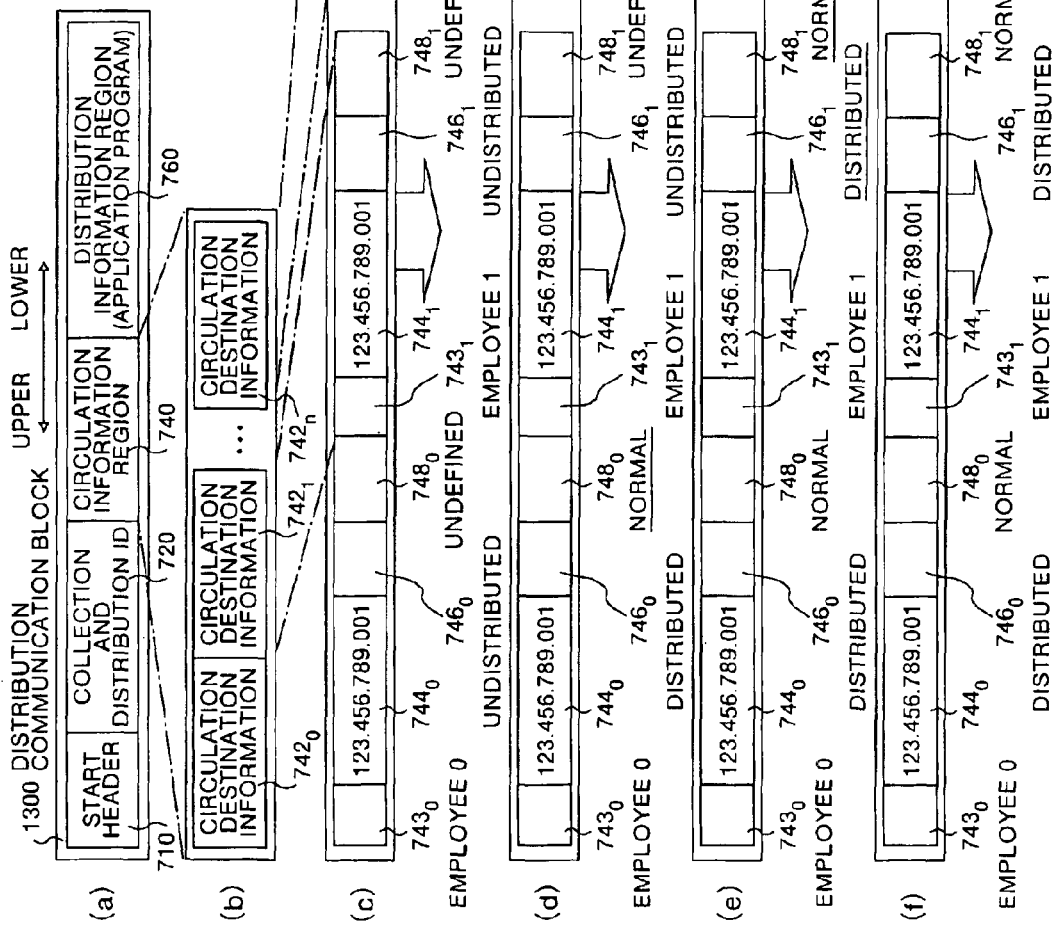
FIG. 21 is a diagram showing state transitions of a distribution communication block 1300 used in the second embodiment.
Figure 22:
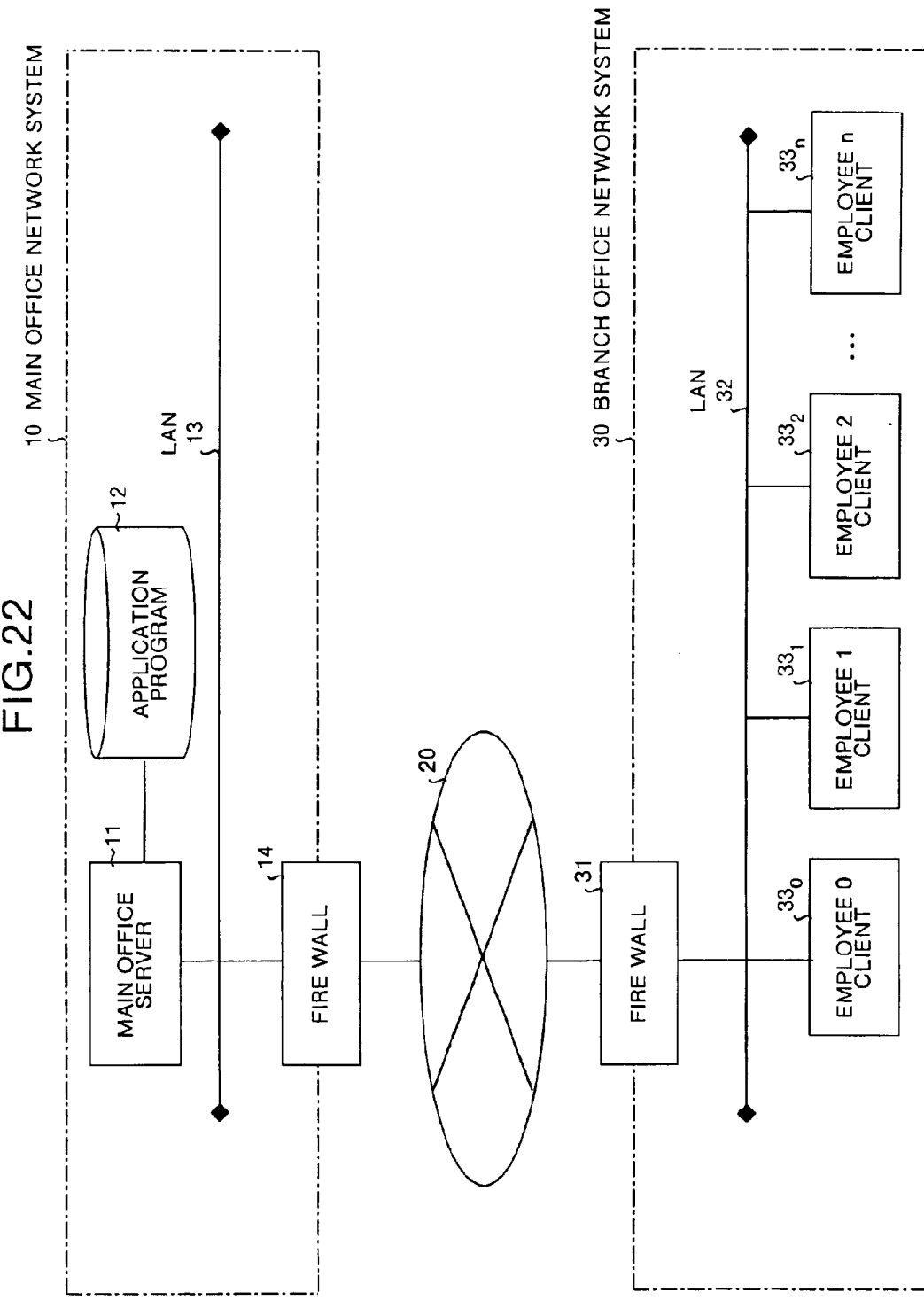
FIG. 22 is a block diagram showing an example of configuration of a conventional information collection and distribution system.

In this case, in the second embodiment, a distribution communication block 1300 shown at (a) in FIG. 21 is used. The data structure of the distribution communication block 1300 is the same as that of the distribution communication block 800 (see FIG. 3). Therefore, the same reference numerals as in FIG. 3 denote the same parts in FIGS. 21A and 21B. The pieces of circulation destination information $742_0$ to $742_n$ shown at (b) in FIG. 21 correspond to the employee 0 client $1230_0$ to the employee n client $1230_n$.

For example, as shown at (c) in FIG. 21, the circulation destination information $742_0$ is constituted by pieces of information, i.e., an "employee" (client name $743_0$), "123.456.789.001" (address $744_0$), "undistributed" (collection and distribution management flag $746_0$), and "undefined" (result management information region $748_0$).

When the distribution communication block 1300 having the circulation information region 740 shown at (c) in FIG. 21 is transmitted to the employee 0 client $1230_0$, as shown at (d) in FIG. 21, transition from "undistributed" to "distributed" occurs in the collection and distribution management flag $746_0$, and transition from "undefined" to "normal" occurs in the result management information region $748_0$. In addition, when the distribution communication block 1300 is transmitted to the employee 1 client $1230_1$ which is the next circulation destination, as shown at (e) in FIG. 21, transition from "undistributed" to "distributed" occurs in the collection and distribution management flag $746_1$, and transition from "undefined" to "normal" occurs in the result management information region $748_1$. Thereafter, the distribution communication block 1300 is sequentially circulated to the employee 2 client $1230_2$ to the employee n client $1230_n$.

When the distribution communication block 1300 is transmitted to the employee n client $1230_n$ which is the final circulation destination, as shown at (f) in FIG. 21, transition from "undistributed" to "distributed" occurs in a collection and distribution management flag $746_n$, and transition from "undefined" to "normal" occurs in the result management information region $748_n$.

The first and second embodiments according to the present invention have been described above with reference to the drawings. However, a concrete configuration is not limited to the first and second embodiments, and the invention also includes inventions which change in design without departing from the spirit and scope of the invention. For example, in the first and second embodiments, the following configuration may be used. That is, an information collection and distribution program for realizing the collection and distribution function is recorded on a computer readable recording medium, and the information collection and distribution program recorded on the recording medium is loaded on a computer and executed, so that collection and distribution of information are realized.

The computer is constituted by a CPU for executing the information collection and distribution program, an input device such as a keyboard or a mouse, a ROM (Read Only Memory) for storing various data, and a RAM (Random Access Memory) for storing an operation parameter or the like, a reading device for read the information collection distribution program from a recording medium, an output device such as a display or a printer, and a bus BU for connecting the devices to each other.

The CPU loads the information collection and distribution program recorded on the recording medium through the reading device and then executes the information collection and distribution program to perform the collection and distribution. The recording medium includes not only a portable recording medium such as an optical disk, a floppy disk, or a hard disk, but also a transmission medium which temporarily records and holds data like a network.

As has been described above, according to the present invention, when a relaying function is given to one client of a plurality of clients, and circulation of all communication blocks is completed, a communication block in which a distribution result is set is relayed to a server through one server. For this reason, unlike a conventional technique, a dedicated server need not be arranged, and, by performing distribution once, a communication block may be transmitted from an in-house network to an external network once. Therefore, a network load can be advantageously reduced with a low cost and a high security.

Furthermore, a client which fails in distribution is recognized on the basis of a distribution result in a communication block related to the first distribution, so that the communication block is re-transmitted to the client. For this reason, the reliability of distribution can be advantageously improved.

In the middle of circulation of a communication block, when the client of the next circulation destination is stopped, as intermediate notification, the communication block from the client is relayed to a server. For this reason, on the server side, a distribution result can be quickly recognized without waiting for the communication block from the client of the final circulation destination.

A plurality of clients are grouped, and communication blocks are parallel circulated in the groups. For this reason, time required for distribution can be advantageously shortened.

When a relaying function is given to one client of a plurality of clients, and circulation of all communication blocks is completed, a communication block in which a collection result is set is relayed to a server through one server. For this reason, unlike a conventional technique, a dedicated server need not be arranged, and, by performing collection once, a communication block may be transmitted from an in-house network to an external network once. Therefore, a network load can be advantageously reduced with a low cost and a high security.

Furthermore, a client which fails in collection is recognized on the basis of a collection result in a communication block related to the first collection, so that the communication block is re-transmitted to the client. For this reason, the reliability of collection can be advantageously improved.

In the middle of circulation of a communication block, when the client of the next circulation destination is stopped, as intermediate notification, the communication block from the client is relayed to a server. For this reason, on the server side, a collection result can be quickly recognized without waiting for the communication block from the client of the final circulation destination.

A plurality of clients are grouped, and communication blocks are parallel circulated in the groups. For this reason, time required for collection can be advantageously shortened.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information collection and distribution system for collecting and distributing information between a server and a plurality of clients which are connected to a network,
    wherein the server transmits a communication block including at least addresses of the plurality of clients and pieces of distribution information to one client of the plurality of clients through said network;
    said one client partitions all the other clients into a plurality of groups and relays the communication block to one client in each of the plurality of groups;
    said one client in each of said plurality of groups obtains the distribution information from the communication block, and circulates the communication block in which distribution results are set to a client next in an order on a basis of destination addresses;
    a final client of a last circulation destination which has received the pieces of distribution information last in each of said plurality of groups transmits the communication block to said one client that has partitioned the clients into groups; and
    said one client that has partitioned the clients into groups merges the communication block from said final client of each circulation destination in each of said plurality of groups to form a merged communication block and relays the merged communication block to said server.

2. The information collection and distribution system according to claim 1, wherein said server recognizes a client which fails in distribution on the basis of the distribution result set in the communication block transmitted from said one client, and re-transmits the communication block to said failed client.

3. The information collection and distribution system according to claim 1, wherein each client other than said one client and said final client transmits the communication block to said one client as intermediate notification when a next client as the circulation destination is in a stop state, and
    said one client relays the communication block transmitted from said client to said server.

4. An information collection and distribution system for collecting and distributing information between a server and a plurality of clients which are connected with a network,
    wherein said server transmits a communication block including at least addresses of the plurality of clients to one client of the plurality of clients through the network;
    said one client partitions all the other clients into a plurality of groups and relays the communication block to one client in each of the plurality of groups;
    said one client in each of said plurality of groups sets pieces of collection information in the communication block, sets a collection result in the communication block, and circulates the communication block to a next client in an order based on the addresses;
    a final client of a last circulation destination which has received the communication block last in each of said plurality of groups transmits the communication block to said one client that has portioned the clients into groups; and
    said one client that has portioned the clients into groups merges the communication block from said final client of each circulation destination in each of said plurality of groups to form a merged communication block and relays the merged communication block to said server.

5. The information collection and distribution system according to claim 4, wherein said server recognizes a client which fails in collection on the basis of the collection result set in the communication block transmitted from said one client, and re-transmits the communication block to said failed client.

6. The information collection and distribution system according to claim 4, wherein each client other than said one client and said final client transmits the communication block to said one client as intermediate notification when a next client as the circulation destination is in a stop state, and
    said one client relays the communication block transmitted from said client to said server.

7. An information collection and distribution method for collecting and distributing information between a server and a plurality of clients which are connected with a network, comprising:
    transmitting a communication block including at least addresses of the plurality of clients and pieces of distribution information to one client of the plurality of clients through said network from the server;
    partitioning all the other clients into a plurality of groups and relaying the communication block to one client in each of the plurality of groups;
    receiving the distribution information from the communication block via said one client in each of the plurality groups, setting a distribution result in the communication block, and circulating the communication block to a next client in an order based on destination addresses;

transmitting the communication block to said one client that has partitioned the clients into groups from a final client in each of said plurality of groups when said final client of a last circulation destination in each of said plurality of groups has received the communication block; and merging the communication block from said final client of each circulation destination in each of said plurality of groups to form a merged communication block and relaying the merged communication block to said server.

8. An information collection and distribution method for collecting and distributing information between a server and a plurality of clients which are connected with a network, comprising:

transmitting a communication block including at least addresses of the plurality of clients to one client of the plurality of clients through said network from the server;

partitioning all the other clients into a plurality of groups and relaying the communication block to one client in each of the plurality of groups;

receiving the communication block via said one client in each of the plurality of groups, setting pieces of collection information and a collection result in the communication block, and circulating the communication block to a next client in an order based on destination addresses;

transmitting the communication block to said one client that has partitioned the clients into groups from a final client in each of said plurality of groups when said final client of a last circulation destination in each of said plurality of groups has received the communication block; and merging the communication block from said final client of each circulation destination in each of said plurality of groups to form a merged communication block and relaying the merged communication block to said server.

9. An information collection and distribution system for collecting and distributing information between a server and a plurality of clients which are connected with a network, wherein the server transmits a communication block including at least addresses of the plurality of clients and pieces of distribution information to one client of the plurality of clients through said network;

said one client partitions all the other clients into a plurality of groups and relays the communication block to one client in each of the plurality of groups;

said one client in each of said plurality of groups obtains the distribution information from the communication block, sets a distribution result in the communication block, and circulates the communication block to a next client in an order based on the destination addresses;

a final client of a last circulation destination which has received the communication block last in each of said plurality of groups transmits the communication block to said one client that has partitioned the clients into groups; and said one client that has partitioned the clients into groups merges the communication block from said final client of each circulation destination in each of said plurality of groups to form a merged communication block and relays the merged communication block to said server.

* * * * *